US012776653B2

(12) United States Patent
Giuliano et al.

(10) Patent No.: US 12,776,653 B2
(45) Date of Patent: Oct. 27, 2026

(54) BATTERY MANAGEMENT SYSTEM WITH ADIABATIC SWITCHED-CAPACITOR CIRCUIT

(71) Applicant: pSemi Corporation, San Diego, CA (US)

(72) Inventors: David M. Giuliano, Brookline, MA (US); David Kunst, Cupertino, CA (US)

(73) Assignee: pSemi Corporation, San Diego, CA (US)

( * ) Notice: Subject to any disclaimer, the term of this patent is extended or adjusted under 35 U.S.C. 154(b) by 907 days.

(21) Appl. No.: 17/457,497

(22) Filed: Dec. 3, 2021

(65) Prior Publication Data

US 2022/0166245 A1 May 26, 2022

Related U.S. Application Data

(63) Continuation of application No. 16/084,041, filed as application No. PCT/US2017/022104 on Mar. 13, 2017, now abandoned.

(Continued)

(51) Int. Cl.
*H01M 10/44* (2006.01)
*H01M 10/46* (2006.01)
(Continued)

(52) U.S. Cl.
CPC *H02J 7/02* (2013.01); *H02J 3/18* (2013.01); *H02J 7/04* (2013.01); *H02M 3/07* (2013.01);
(Continued)

(58) Field of Classification Search
CPC .......... H02J 7/02; H02J 7/04; H02J 7/007182; H02J 50/80; H02J 3/18; H02J 2207/20;
(Continued)

(56) References Cited

U.S. PATENT DOCUMENTS 3,370,215 A 2/1968 Light, Jr.
3,745,437 A 7/1973 Brown
(Continued)

FOREIGN PATENT DOCUMENTS

CN 1057410 A 1/1992
CN 1132959 A 10/1996
(Continued)

OTHER PUBLICATIONS

Zhang et al., "A Gan Transistor based 90W AC/DC Adapter with a Buck-PFC Stage and an Isolated Quasi-Switched • Capacitor DC/DC Stage," IEEE, 2014 , pp. 109-116.
(Continued)

*Primary Examiner* — Edward Tso
(74) *Attorney, Agent, or Firm* — Haynes and Boone, LLP

(57) ABSTRACT

An apparatus for switching between powering a load from a battery and powering the load from another power source includes a battery manager and a switched-capacitor network, wherein the switched-capacitor network comprises a plurality of capacitors, first and second switch sets, and a controller, wherein the controller causes the switched-capacitor network to transition between a first state and a second state.

43 Claims, 22 Drawing Sheets

Related U.S. Application Data

(60) Provisional application No. 62/306,749, filed on Mar. 11, 2016.

(51) Int. Cl.

| | |
|---|---|
| ***H02J 3/18*** | (2006.01) |
| ***H02J 7/02*** | (2016.01) |
| ***H02J 7/04*** | (2006.01) |
| ***H02M 3/07*** | (2006.01) |
| *H02J 7/96* | (2026.01) |
| *H02M 1/00* | (2006.01) |
| *H02M 3/158* | (2006.01) |
| *H02M 3/335* | (2006.01) |

(52) U.S. Cl.
CPC ............. *H02J 7/96* (2026.01); *H02J 2207/20* (2020.01); *H02M 1/007* (2021.05); *H02M 3/073* (2013.01); *H02M 3/158* (2013.01); *H02M 3/335* (2013.01)

(58) Field of Classification Search
CPC ...... H02M 1/007; H02M 3/073; H02M 3/158; H02M 3/07
USPC ....... 320/107, 108, 114, 104, 144, 132, 150, 320/143
See application file for complete search history.

(56) References Cited

U.S. PATENT DOCUMENTS

| | | | |
|---|---|---|---|
| 3,818,306 | A | 6/1974 | Marini |
| 3,818,360 | A | 6/1974 | Boutmy et al. |
| 4,214,174 | A | 7/1980 | Dickson |
| 4,408,268 | A | 10/1983 | Itari et al. |
| 4,415,959 | A | 11/1983 | Vinciarelli |
| 4,513,364 | A | 4/1985 | Nilssen |
| 4,604,584 | A | 8/1986 | Kelley |
| 4,713,742 | A | 12/1987 | Parsley |
| 4,812,961 | A | 3/1989 | Dobkin et al. |
| 4,903,181 | A | 2/1990 | Seidel |
| 5,006,782 | A | 4/1991 | Pelly |
| 5,057,986 | A | 10/1991 | Henze et al. |
| 5,119,283 | A | 6/1992 | Steigerwald et al. |
| 5,132,606 | A | 7/1992 | Herbert |
| 5,132,895 | A | 7/1992 | Kase |
| 5,159,539 | A | 10/1992 | Koyama |
| 5,198,970 | A | 3/1993 | Kawabata et al. |
| 5,268,832 | A | 12/1993 | Kandatsu |
| 5,301,097 | A | 4/1994 | McDaniel |
| 5,331,303 | A | 7/1994 | Shiota |
| 5,345,376 | A | 9/1994 | Nourbakhsh |
| 5,402,329 | A | 3/1995 | Wittenbreder |
| 5,548,206 | A | 8/1996 | Soo |
| 5,557,193 | A | 9/1996 | Kajimoto |
| 5,563,779 | A | 10/1996 | Zavaleta et al. |
| 5,581,454 | A | 12/1996 | Collins |
| 5,602,794 | A | 2/1997 | Javanifard et al. |
| 5,610,807 | A | 3/1997 | Kanda et al. |
| 5,661,348 | A | 8/1997 | Brown |
| 5,717,581 | A | 2/1998 | Canclini |
| 5,723,970 | A | 3/1998 | Bell |
| 5,737,201 | A | 4/1998 | Foch et al. |
| 5,761,058 | A | 6/1998 | Ohnishi et al. |
| 5,793,626 | A | 8/1998 | Jiang |
| 5,801,987 | A | 9/1998 | Dinh |
| 5,812,017 | A | 9/1998 | Golla et al. |
| 5,831,846 | A | 11/1998 | Jiang |
| 5,892,395 | A | 4/1999 | Olson et al. |
| 5,907,484 | A | 5/1999 | Kowshik et al. |
| 5,956,243 | A | 9/1999 | Mao |
| 5,959,565 | A | 9/1999 | Taniuchi et al. |
| 5,959,585 | A | 9/1999 | Militz |
| 5,978,283 | A | 11/1999 | Lee et al. |
| 5,982,645 | A | 11/1999 | Levran et al. |
| 5,991,169 | A | 11/1999 | Kooken |
| 6,021,056 | A | 2/2000 | Forbes et al. |
| 6,055,168 | A | 4/2000 | Kotowski et al. |
| 6,084,789 | A | 7/2000 | Van Lieshout |
| 6,107,864 | A | 8/2000 | Fukushima et al. |
| 6,133,788 | A | 10/2000 | Dent |
| 6,140,807 | A | 10/2000 | Alberth, Jr. et al. |
| 6,154,380 | A | 11/2000 | Rolleberg et al. |
| 6,157,253 | A | 12/2000 | Myers et al. |
| 6,169,457 | B1 | 1/2001 | Ichimaru |
| 6,169,673 | B1 | 1/2001 | McIntyre et al. |
| 6,178,102 | B1 | 1/2001 | Stanley |
| 6,198,645 | B1 | 3/2001 | McIntyre et al. |
| 6,255,896 | B1 | 7/2001 | Guliani et al. |
| 6,255,906 | B1 | 7/2001 | Eidson et al. |
| 6,275,018 | B1 | 8/2001 | Telefus et al. |
| 6,316,956 | B1 | 11/2001 | Oglesbee |
| 6,327,462 | B1 | 12/2001 | Kamke et al. |
| 6,329,796 | B1 | 12/2001 | Popescu |
| 6,339,538 | B1 | 1/2002 | Handleman |
| 6,362,986 | B1 | 3/2002 | Schultz et al. |
| 6,377,117 | B2 | 4/2002 | Oskowsky et al. |
| 6,396,341 | B1 | 5/2002 | Pehlke |
| 6,400,579 | B2 | 6/2002 | Cuk |
| 6,429,632 | B1 | 8/2002 | Ahn et al. |
| 6,456,153 | B2 | 9/2002 | Buck et al. |
| 6,476,666 | B1 | 11/2002 | Palusa et al. |
| 6,486,728 | B2 | 11/2002 | Kleveland |
| 6,501,325 | B1 | 12/2002 | Meng |
| 6,504,422 | B1 | 1/2003 | Rader et al. |
| 6,507,503 | B2 | 1/2003 | Norrga |
| 6,515,612 | B1 | 2/2003 | Abel |
| 6,563,235 | B1 | 5/2003 | McIntyre et al. |
| 6,597,235 | B2 | 7/2003 | Choi |
| 6,617,832 | B1 | 9/2003 | Kobayashi |
| 6,650,552 | B2 | 11/2003 | Takagi et al. |
| 6,657,876 | B2 | 12/2003 | Satoh |
| 6,700,803 | B2 | 3/2004 | Krein |
| 6,738,277 | B2 | 5/2004 | Odell |
| 6,738,432 | B2 | 5/2004 | Pehlke et al. |
| 6,759,766 | B2 | 7/2004 | Hiratsuka et al. |
| 6,791,298 | B2 | 9/2004 | Shenai et al. |
| 6,798,177 | B1 | 9/2004 | Shih et al. |
| 6,906,567 | B2 | 6/2005 | Culler |
| 6,927,441 | B2 | 8/2005 | Conte et al. |
| 6,934,167 | B2 | 8/2005 | Jang et al. |
| 6,980,045 | B1 | 12/2005 | Liu |
| 6,980,181 | B2 | 12/2005 | Sudo |
| 6,995,995 | B2 | 2/2006 | Burgyan et al. |
| 7,009,858 | B2 | 3/2006 | Umeda et al. |
| 7,071,660 | B2 | 7/2006 | Ren et al. |
| 7,072,195 | B2 | 7/2006 | Xu |
| 7,091,778 | B2 | 8/2006 | Dennis et al. |
| 7,103,114 | B1 | 9/2006 | Lapierre |
| 7,135,847 | B2 | 11/2006 | Taurand |
| 7,145,382 | B2 | 12/2006 | Ker et al. |
| 7,157,956 | B2 | 1/2007 | Wei |
| 7,161,816 | B2 | 1/2007 | Telefus et al. |
| 7,190,210 | B2 | 3/2007 | Azrai et al. |
| 7,224,062 | B2 | 5/2007 | Hsu |
| 7,236,542 | B2 | 6/2007 | Matero |
| 7,239,194 | B2 | 7/2007 | Azrai et al. |
| 7,250,810 | B1 | 7/2007 | Tsen |
| 7,259,974 | B2 | 8/2007 | Donaldson et al. |
| 7,269,036 | B2 | 9/2007 | Deng et al. |
| 7,330,070 | B2 | 2/2008 | Vaeisaenen et al. |
| 7,362,251 | B2 | 4/2008 | Zolfaghari et al. |
| 7,365,523 | B2 | 4/2008 | Malherbe et al. |
| 7,375,992 | B2 | 5/2008 | Mok et al. |
| 7,382,113 | B2 | 6/2008 | Wai et al. |
| 7,382,634 | B2 | 6/2008 | Buchmann |
| 7,397,677 | B1 | 7/2008 | Collins et al. |
| 7,400,118 | B1 | 7/2008 | Zhang et al. |
| 7,408,330 | B1 | 8/2008 | Zhao |
| 7,436,239 | B2 | 10/2008 | Masuko et al. |
| 7,443,705 | B2 | 10/2008 | Ito |
| 7,511,978 | B2 | 3/2009 | Li et al. |
| 7,521,914 | B2 | 4/2009 | Dickerson et al. |
| 7,535,133 | B2 | 5/2009 | Han et al. |

(56) References Cited

U.S. PATENT DOCUMENTS 7,545,127 B2 6/2009 Takahashi et al.
7,589,605 B2 9/2009 Perreault et al.
7,595,682 B2 9/2009 Lin et al.
7,595,683 B1 9/2009 Floyd
7,616,467 B2 11/2009 Mallwitz
7,633,778 B2 12/2009 Lee et al.
7,642,797 B2 1/2010 Kojima et al.
7,656,740 B2 2/2010 Han et al.
7,659,760 B2 2/2010 Doi
7,679,429 B2 3/2010 Nakamura
7,679,430 B2 3/2010 Siracusa et al.
7,696,735 B2 4/2010 Oraw et al.
7,705,672 B1 4/2010 Rodriguez
7,705,681 B2 4/2010 Ilkov
7,724,551 B2 5/2010 Yanagida et al.
7,746,041 B2 6/2010 Xu et al.
7,768,800 B2 8/2010 Mazumder et al.
7,777,459 B2 8/2010 Williams
7,782,027 B2 8/2010 Williams
7,786,712 B2 8/2010 Williams
7,807,499 B2 10/2010 Nishizawa
7,808,324 B1 10/2010 Allen et al.
7,812,579 B2 10/2010 Williams
7,889,519 B2 2/2011 Perreault et al.
7,907,429 B2 3/2011 Ramadass
7,907,430 B2 3/2011 Kularatna et al.
7,928,705 B2 4/2011 Uildriks et al.
7,940,038 B2 5/2011 Da Silva et al.
7,944,276 B2 5/2011 Nakai
7,952,418 B2 5/2011 McDonald et al.
7,956,572 B2 6/2011 Zane et al.
7,956,673 B2 6/2011 Pan
7,977,921 B2 7/2011 Bahai et al.
7,977,927 B2 7/2011 Williams
7,999,601 B2 8/2011 Voorwinden et al.
8,000,117 B2 8/2011 Petricek
8,018,216 B2 9/2011 Kakehi
8,026,763 B2 9/2011 Dawson et al.
8,031,003 B2 10/2011 Dishop
8,035,148 B2 10/2011 Goldstein
8,040,174 B2 10/2011 Likhterov
8,048,766 B2 11/2011 Joly et al.
8,076,915 B2 12/2011 Nakazawa
8,085,524 B2 12/2011 Roozeboom et al.
8,089,788 B2 1/2012 Jain
8,102,157 B2 1/2012 Abe
8,106,597 B2 1/2012 Mednik et al.
8,111,052 B2 2/2012 Glovinsky
8,111,054 B2 2/2012 Yen et al.
8,130,518 B2 3/2012 Fishman
8,154,333 B2 4/2012 Weng et al.
8,159,091 B2 4/2012 Yeates
8,164,369 B2 4/2012 Raghunathan et al.
8,164,384 B2 4/2012 Dawson et al.
8,169,797 B2 5/2012 Coccia et al.
8,193,604 B2 6/2012 Lin et al.
8,212,541 B2 7/2012 Giuliano et al.
8,248,045 B2 8/2012 Shiu
8,248,054 B2 8/2012 Tong
8,274,322 B2 9/2012 Shen et al.
8,276,002 B2 9/2012 Dennard et al.
8,330,436 B2 12/2012 Oraw et al.
8,339,102 B2 12/2012 Kushnarenko et al.
8,339,184 B2 12/2012 Tam et al.
8,350,549 B2 1/2013 Kitabatake
8,354,828 B2 1/2013 Huang et al.
8,384,467 B1 2/2013 Klein et al.
8,395,914 B2 3/2013 Klootwijk et al.
8,423,800 B2 4/2013 Huang
8,436,674 B1 5/2013 Patel et al.
8,451,053 B2 5/2013 Perreault et al.
8,456,874 B2 6/2013 Beck et al.
8,503,203 B1 8/2013 Szczeszynski et al.
8,515,361 B2 8/2013 Levesque et al.
8,525,487 B1 9/2013 Stevenson
8,538,355 B2 9/2013 Stockert
8,542,061 B2 9/2013 Levesque et al.
8,542,169 B2 9/2013 Senda
8,559,898 B2 10/2013 Jones et al.
8,565,694 B2 10/2013 Jones et al.
8,571,492 B2 10/2013 Berchtold et al.
8,582,333 B2 11/2013 Oraw et al.
8,619,443 B2 12/2013 Lumsden
8,619,445 B1 12/2013 Szczeszynski et al.
8,629,666 B2 1/2014 Carroll et al.
8,643,347 B2 2/2014 Giuliano et al.
8,659,353 B2 2/2014 Dawson et al.
8,670,254 B2 3/2014 Perreault et al.
8,674,545 B2 3/2014 Pulvirenti et al.
8,693,224 B1 4/2014 Giuliano
8,699,248 B2 4/2014 Giuliano et al.
8,699,973 B2 4/2014 Southcombe et al.
8,706,063 B2 4/2014 Honjo et al.
8,712,349 B2 4/2014 Southcombe et al.
8,718,188 B2 5/2014 Balteanu et al.
8,723,491 B2 5/2014 Giuliano
8,724,353 B1 5/2014 Giuliano et al.
8,729,819 B2 5/2014 Zhao et al.
8,731,498 B2 5/2014 Southcombe et al.
8,737,093 B1 5/2014 Baker et al.
8,743,553 B2 6/2014 Giuliano
8,750,539 B2 6/2014 Pennock et al.
8,760,219 B2 6/2014 Chao
8,803,492 B2 8/2014 Liu
8,811,920 B2 8/2014 Deuchars et al.
8,811,921 B2 8/2014 Jones et al.
8,817,501 B1 8/2014 Low
8,824,978 B2 9/2014 Briffa et al.
8,829,993 B2 9/2014 Briffa et al.
8,830,709 B2 9/2014 Perreault
8,830,710 B2 9/2014 Perreault et al.
8,831,544 B2 9/2014 Walker et al.
8,842,399 B2 9/2014 Jones et al.
8,854,019 B1 10/2014 Levesque
8,854,849 B2 10/2014 Kobeda
8,856,562 B2 10/2014 Huang et al.
8,860,396 B2 10/2014 Giuliano
8,867,281 B2 10/2014 Ly et al.
8,874,828 B2 10/2014 Fai et al.
8,891,258 B2 11/2014 Zhang et al.
8,892,063 B2 11/2014 Jones et al.
8,913,967 B2 12/2014 Zimlich et al.
8,913,971 B2 12/2014 Arkiszewski et al.
8,942,650 B2 1/2015 Southcombe et al.
8,942,651 B2 1/2015 Jones
8,947,157 B2 2/2015 Levesque et al.
8,957,727 B2 2/2015 Dawson et al.
8,958,763 B2 2/2015 Williams et al.
8,981,836 B2 3/2015 Kern et al.
8,983,407 B2 3/2015 Southcombe et al.
8,983,409 B2 3/2015 Ngo et al.
8,983,410 B2 3/2015 Southcombe et al.
8,989,685 B2 3/2015 Southcombe et al.
9,008,597 B2 4/2015 Levesque et al.
9,030,256 B2 5/2015 Jones et al.
9,041,459 B2 5/2015 Szczeszynski
9,048,787 B2 6/2015 Jones et al.
9,077,405 B2 7/2015 Jones et al.
9,143,032 B2 9/2015 Le et al.
9,143,037 B2 9/2015 Giuliano
9,184,701 B2 11/2015 Berchtold et al.
9,203,299 B2 12/2015 Low et al.
9,209,758 B2 12/2015 Briffa et al.
9,209,787 B2 12/2015 Shelton et al.
9,214,865 B2 12/2015 Levesque et al.
9,214,900 B2 12/2015 Arkiszewski
9,362,825 B2 6/2016 Southcombe et al.
9,362,826 B2 6/2016 Giuliano
9,374,001 B1 6/2016 Subramaniam et al.
9,413,257 B2 8/2016 Wang et al.
9,444,329 B2 9/2016 Arno
9,450,506 B2 9/2016 Perreault et al.
9,502,968 B2 11/2016 Giuliano et al.
9,553,550 B2 1/2017 Puliafico et al.

(56) References Cited

U.S. PATENT DOCUMENTS 9,577,590 B2 2/2017 Levesque et al.
9,584,024 B2 2/2017 Manthe et al.
9,601,998 B2 3/2017 Le et al.
9,621,138 B1 4/2017 Zhang et al.
9,634,577 B2 4/2017 Perreault
9,658,635 B2 5/2017 Szczeszynski
9,712,051 B2 7/2017 Giuliano
9,722,492 B2 8/2017 Levesque et al.
9,742,266 B2 8/2017 Szczeszynski et al.
9,755,672 B2 9/2017 Perreault et al.
9,819,283 B2 11/2017 Mahdavikhah et al.
9,847,712 B2 12/2017 Low et al.
9,847,715 B2 12/2017 Giuliano et al.
9,882,471 B2 1/2018 Giuliano
9,899,919 B2 2/2018 Crossley et al.
9,900,204 B2 2/2018 Levesque et al.
10,243,457 B2 3/2019 Puggelli et al.
10,263,512 B2 4/2019 Giuliano et al.
10,274,987 B2 4/2019 Puggelli et al.
10,326,358 B2 6/2019 Giuliano
10,355,593 B1 7/2019 Puggelli et al.
10,374,512 B2 8/2019 Szczeszynski et al.
10,381,924 B2 8/2019 Giuliano
10,389,235 B2 8/2019 Giuliano
10,389,244 B2 8/2019 Le et al.
10,404,162 B2 9/2019 Giuliano
10,411,490 B2 9/2019 Melgar et al.
10,523,039 B2 12/2019 Melgar et al.
10,541,603 B2 1/2020 Puggelli et al.
10,601,311 B2 3/2020 Meyvaert et al.
10,644,590 B2 5/2020 Giuliano et al.
10,666,134 B2 5/2020 Low et al.
10,673,335 B2 6/2020 Le et al.
10,680,515 B2 6/2020 Giuliano
10,686,380 B2 6/2020 Giuliano
10,715,035 B2 7/2020 Li et al.
10,720,832 B2 7/2020 Meyvaert et al.
10,770,976 B2 9/2020 Giuliano et al.
10,833,579 B1 11/2020 Puggelli et al.
11,264,895 B2 3/2022 Giuliano et al.
11,342,844 B1 5/2022 Meyvaert
11,515,784 B2 11/2022 Meyvaert
2002/0008567 A1 1/2002 Henry
2002/0130704 A1 9/2002 Myono et al.
2002/0158660 A1 10/2002 Jang et al.
2003/0038669 A1 2/2003 Zhang
2003/0058665 A1 3/2003 Kobayashi et al.
2003/0151449 A1 8/2003 Nakagawa et al.
2003/0169096 A1 9/2003 Hsu et al.
2003/0169896 A1 9/2003 Kirk, III et al.
2003/0227280 A1 12/2003 Vinciarelli
2004/0041620 A1 3/2004 D'Angelo et al.
2004/0080964 A1 4/2004 Buchmann
2004/0095787 A1 5/2004 Donaldson et al.
2004/0170030 A1 9/2004 Duerbaum et al.
2004/0222775 A1 11/2004 Muramatsu et al.
2004/0246044 A1 12/2004 Myono et al.
2005/0007184 A1 1/2005 Kamijo
2005/0024125 A1 2/2005 McNitt et al.
2005/0068073 A1 3/2005 Shi et al.
2005/0088865 A1 4/2005 Lopez et al.
2005/0102798 A1 5/2005 Kato
2005/0136873 A1 6/2005 Kim et al.
2005/0169021 A1 8/2005 Itoh
2005/0207133 A1 9/2005 Pavier et al.
2005/0213267 A1 9/2005 Azrai et al.
2005/0254272 A1 11/2005 Vinciarelli
2005/0285767 A1 12/2005 Wang et al.
2005/0286278 A1 12/2005 Perreault et al.
2006/0139021 A1 6/2006 Taurand
2006/0186947 A1 8/2006 Lin et al.
2006/0213890 A1 9/2006 Kooken et al.
2006/0226130 A1 10/2006 Kooken et al.
2007/0018700 A1 1/2007 Yen et al.
2007/0035973 A1 2/2007 Kitazaki et al.
2007/0035977 A1 2/2007 Odell
2007/0051712 A1 3/2007 Kooken et al.
2007/0066224 A1 3/2007 d'Hont et al.
2007/0066250 A1 3/2007 Takahashi et al.
2007/0069818 A1 3/2007 Bhatti et al.
2007/0091655 A1 4/2007 Oyama et al.
2007/0123184 A1 5/2007 Nesimoglu et al.
2007/0146020 A1 6/2007 Williams
2007/0146052 A1 6/2007 Byeon
2007/0146090 A1 6/2007 Carey et al.
2007/0159257 A1 7/2007 Lee et al.
2007/0171680 A1 7/2007 Perreault et al.
2007/0182368 A1 8/2007 Yang
2007/0210774 A1 9/2007 Kimura et al.
2007/0230221 A1 10/2007 Lim et al.
2007/0247222 A1 10/2007 Sorrells et al.
2007/0247253 A1 10/2007 Carey et al.
2007/0281635 A1 12/2007 McCallister et al.
2007/0290747 A1 12/2007 Traylor et al.
2007/0291718 A1 12/2007 Chan et al.
2007/0296383 A1 12/2007 Xu et al.
2008/0001660 A1 1/2008 Rasmussen
2008/0003960 A1 1/2008 Zolfaghari
2008/0003962 A1 1/2008 Ngai
2008/0007333 A1 1/2008 Lee et al.
2008/0008273 A1 1/2008 Kim et al.
2008/0009248 A1 1/2008 Rozenblit et al.
2008/0012637 A1 1/2008 Aridas et al.
2008/0013236 A1 1/2008 Weng
2008/0019459 A1 1/2008 Chen et al.
2008/0024198 A1 1/2008 Bitonti et al.
2008/0031023 A1 2/2008 Kitagawa et al.
2008/0051044 A1 2/2008 Takehara
2008/0055946 A1 3/2008 Lesso et al.
2008/0062724 A1 3/2008 Feng et al.
2008/0100143 A1* 5/2008 Lipcsei ................. H02J 7/0068 307/80
2008/0136500 A1 6/2008 Frulio et al.
2008/0136559 A1 6/2008 Takahashi et al.
2008/0136991 A1 6/2008 Senda
2008/0150619 A1 6/2008 Lesso et al.
2008/0150621 A1 6/2008 Lesso et al.
2008/0157732 A1 7/2008 Williams
2008/0157733 A1 7/2008 Williams
2008/0158915 A1 7/2008 Williams
2008/0186081 A1 8/2008 Yamahira et al.
2008/0231233 A1 9/2008 Thornton
2008/0233913 A1 9/2008 Sivasubramaniam
2008/0239772 A1 10/2008 Oraw et al.
2008/0266917 A1 10/2008 Lin et al.
2008/0284398 A1 11/2008 Qiu et al.
2009/0004981 A1 1/2009 Eliezer et al.
2009/0033289 A1 2/2009 Xing
2009/0033293 A1 2/2009 Xing et al.
2009/0039843 A1 2/2009 Kudo
2009/0059630 A1 3/2009 Williams
2009/0066407 A1 3/2009 Bowman et al.
2009/0072800 A1 3/2009 Ramadass
2009/0102439 A1 4/2009 Williams
2009/0147554 A1 6/2009 Adest et al.
2009/0174383 A1 7/2009 Tsui et al.
2009/0176464 A1 7/2009 Liang et al.
2009/0196082 A1 8/2009 Mazumder et al.
2009/0206804 A1 8/2009 Xu et al.
2009/0224834 A1 9/2009 Young
2009/0225012 A1 9/2009 Choi
2009/0230934 A1 9/2009 Hooijschuur et al.
2009/0257211 A1 10/2009 Kontani et al.
2009/0273955 A1 11/2009 Tseng et al.
2009/0278520 A1 11/2009 Perreault et al.
2009/0302686 A1 12/2009 Fishman
2009/0303753 A1 12/2009 Fu et al.
2009/0309566 A1 12/2009 Shiu
2009/0311980 A1 12/2009 Sjoland
2009/0322304 A1 12/2009 Oraw et al.
2009/0322414 A1 12/2009 Oraw et al.
2009/0323380 A1 12/2009 Harrison
2010/0013548 A1 1/2010 Barrow
2010/0027596 A1 2/2010 Bellaouar et al.

(56) References Cited

U.S. PATENT DOCUMENTS

2010/0060326 A1 3/2010 Palmer et al.
2010/0073084 A1 3/2010 Hur et al.
2010/0085786 A1 4/2010 Chiu et al.
2010/0097104 A1 4/2010 Yang et al.
2010/0110741 A1 5/2010 Lin et al.
2010/0117612 A1 5/2010 Klootwijk et al.
2010/0117700 A1 5/2010 Raghunathan et al.
2010/0117719 A1 5/2010 Matano
2010/0118458 A1 5/2010 Coffey
2010/0120475 A1 5/2010 Taniuchi et al.
2010/0123447 A1 5/2010 Vecera et al.
2010/0140736 A1 6/2010 Lin et al.
2010/0142239 A1 6/2010 Hopper
2010/0156370 A1 6/2010 Tseng et al.
2010/0164579 A1 7/2010 Acatrinei
2010/0176869 A1 7/2010 Horie et al.
2010/0201441 A1 8/2010 Gustavsson
2010/0202161 A1 8/2010 Sims et al.
2010/0205614 A1 8/2010 Harrington
2010/0214746 A1 8/2010 Lotfi et al.
2010/0237833 A1 9/2010 Abe
2010/0244189 A1 9/2010 Klootwijk et al.
2010/0244585 A1 9/2010 Tan et al.
2010/0244935 A1 9/2010 Kim et al.
2010/0291888 A1 11/2010 Hadjichristos et al.
2010/0308751 A1 12/2010 Nerone
2010/0321041 A1 12/2010 Feldtkeller
2011/0001542 A1 1/2011 Ranta et al.
2011/0026275 A1 2/2011 Huang et al.
2011/0050325 A1 3/2011 Schatzberger et al.
2011/0051476 A1 3/2011 Manor et al.
2011/0062940 A1 3/2011 Shvartsman
2011/0089483 A1 4/2011 Reynes
2011/0101884 A1 5/2011 Kim et al.
2011/0101938 A1 5/2011 Ma et al.
2011/0115550 A1 5/2011 Pelley
2011/0148385 A1 6/2011 North
2011/0148518 A1 6/2011 Lejon et al.
2011/0156819 A1 6/2011 Kim et al.
2011/0163414 A1 7/2011 Lin et al.
2011/0175591 A1 7/2011 Cuk
2011/0176335 A1 7/2011 Li et al.
2011/0181115 A1 7/2011 Ivanov
2011/0181128 A1 7/2011 Perreault et al.
2011/0204858 A1 8/2011 Kudo
2011/0236766 A1 9/2011 Kolosnitsyn et al.
2011/0241767 A1 10/2011 Curatola et al.
2011/0273151 A1 11/2011 Lesso et al.
2011/0304310 A1 12/2011 Sotono
2012/0014153 A1 1/2012 Christoph et al.
2012/0043818 A1 2/2012 Stratakos et al.
2012/0050137 A1 3/2012 Hellenthal et al.
2012/0064953 A1 3/2012 Dagher et al.
2012/0074891 A1 3/2012 Zhang
2012/0075891 A1 3/2012 Zhang et al.
2012/0105137 A1 5/2012 Kok et al.
2012/0119718 A1 5/2012 Song
2012/0126909 A1 5/2012 Mccune, Jr.
2012/0139515 A1 6/2012 Li
2012/0146177 A1 6/2012 Choi et al.
2012/0146451 A1 6/2012 Nitta
2012/0153907 A1 6/2012 Carobolante et al.
2012/0153912 A1 6/2012 Demski et al.
2012/0154023 A1 6/2012 Pan et al.
2012/0158188 A1 6/2012 Madala
2012/0170334 A1 7/2012 Menegoli et al.
2012/0176195 A1 7/2012 Dawson et al.
2012/0200340 A1 8/2012 Shook et al.
2012/0212201 A1 8/2012 Lee et al.
2012/0223773 A1 9/2012 Jones et al.
2012/0243267 A1 9/2012 Kassayan
2012/0249096 A1 10/2012 Enenkel
2012/0249224 A1 10/2012 Wei et al.
2012/0250360 A1 10/2012 Orr et al.
2012/0252382 A1 10/2012 Bashir et al.
2012/0268030 A1 10/2012 Riesebosch
2012/0268063 A1* 10/2012 Qiu .......................... H02J 7/02 363/84
2012/0313602 A1 12/2012 Perreault et al.
2012/0326684 A1 12/2012 Perreault et al.
2013/0005286 A1 1/2013 Chan et al.
2013/0044519 A1 2/2013 Teraura et al.
2013/0049714 A1 2/2013 Chiu
2013/0049885 A1 2/2013 Rozman et al.
2013/0058049 A1 3/2013 Roth et al.
2013/0058141 A1 3/2013 Oraw et al.
2013/0069614 A1 3/2013 Tso et al.
2013/0093381 A1 4/2013 Mcginley
2013/0094157 A1 4/2013 Giuliano
2013/0106380 A1 5/2013 Marsili et al.
2013/0154491 A1 6/2013 Hawley
2013/0154600 A1 6/2013 Giuliano
2013/0163302 A1 6/2013 Li et al.
2013/0163392 A1 6/2013 Braunberger
2013/0181521 A1 7/2013 Khlat
2013/0187612 A1 7/2013 Aiura
2013/0201729 A1 8/2013 Ahsanuzzaman et al.
2013/0229841 A1 9/2013 Garrity
2013/0234785 A1 9/2013 Dai
2013/0241625 A1 9/2013 Perreault et al.
2013/0245487 A1 9/2013 Aga
2013/0279224 A1 10/2013 Ofek
2013/0287231 A1 10/2013 Kropfitsch
2013/0293310 A1 11/2013 Levesque et al.
2013/0313904 A1 11/2013 Kayama
2013/0322126 A1 12/2013 Pan et al.
2013/0343106 A1 12/2013 Perreault et al.
2013/0343107 A1 12/2013 Perreault
2014/0015731 A1 1/2014 Khlat et al.
2014/0022005 A1 1/2014 Ramanan et al.
2014/0070787 A1 3/2014 Arno
2014/0091773 A1 4/2014 Burlingame et al.
2014/0092643 A1 4/2014 Luccato
2014/0118065 A1 5/2014 Briffa et al.
2014/0118072 A1 5/2014 Briffa et al.
2014/0120854 A1 5/2014 Briffa et al.
2014/0167513 A1 6/2014 Chang et al.
2014/0167722 A1 6/2014 Lee
2014/0167853 A1 6/2014 Haruna et al.
2014/0177300 A1 6/2014 Lagorce et al.
2014/0184177 A1 7/2014 Tournatory et al.
2014/0266132 A1 9/2014 Low et al.
2014/0268945 A1 9/2014 Low et al.
2014/0313781 A1 10/2014 Perreault et al.
2014/0339918 A1 11/2014 Perreault et al.
2014/0355322 A1 12/2014 Perreault et al.
2015/0002195 A1 1/2015 Englekirk
2015/0023063 A1 1/2015 Perreault et al.
2015/0077175 A1 3/2015 Giuliano et al.
2015/0077176 A1 3/2015 Szczeszynski et al.
2015/0084701 A1 3/2015 Perreault et al.
2015/0102798 A1 4/2015 Giuliano
2015/0222192 A1 8/2015 Freeman et al.
2015/0255547 A1 9/2015 Yuan et al.
2015/0295497 A1 10/2015 Perreault et al.
2015/0318851 A1 11/2015 Roberts et al.
2015/0326113 A1 11/2015 Szczeszynski
2015/0380930 A1 12/2015 Smith
2016/0028302 A1 1/2016 Low
2023/0047446 A1* 2/2023 Liu ...................... H02J 7/0016
2024/0235242 A1* 7/2024 Fang .................... H02J 7/0013

FOREIGN PATENT DOCUMENTS

CN 1057410 C 10/2000
CN 1452306 A 10/2003
CN 1483204 A 3/2004
CN 1728518 A 2/2006
CN 1761136 A 4/2006
CN 1825485 A 8/2006
CN 1988349 A 6/2007
CN 101009433 8/2007
CN 101009433 A 8/2007
CN 101034536 A 9/2007

(56) References Cited

FOREIGN PATENT DOCUMENTS

| | | | |
|---|---|---|---|
| CN | 101071981 | A | 11/2007 |
| CN | 101079576 | A | 11/2007 |
| CN | 101174789 | A | 5/2008 |
| CN | 101286696 | A | 10/2008 |
| CN | 101297465 | A | 10/2008 |
| CN | 101399496 | A | 4/2009 |
| CN | 101447753 | A | 6/2009 |
| CN | 101563845 | A | 10/2009 |
| CN | 101588135 | A | 11/2009 |
| CN | 101611531 | A | 12/2009 |
| CN | 101636702 | A | 1/2010 |
| CN | 101647181 | A | 2/2010 |
| CN | 101647182 | A | 2/2010 |
| CN | 101662208 | A | 3/2010 |
| CN | 101707437 | A | 5/2010 |
| CN | 101765963 | A | 6/2010 |
| CN | 101931204 | A | 12/2010 |
| CN | 101976953 | A | 2/2011 |
| CN | 101997406 | A | 3/2011 |
| CN | 102055328 | A | 5/2011 |
| CN | 102118130 | A | 7/2011 |
| CN | 102171918 | A | 8/2011 |
| CN | 102185484 | A | 9/2011 |
| CN | 102210102 | A | 10/2011 |
| CN | 102480291 | A | 5/2012 |
| CN | 102769986 | A | 11/2012 |
| CN | 102904436 | A | 1/2013 |
| CN | 103178711 | A | 6/2013 |
| CN | 103275753 | A | 9/2013 |
| CN | 103636288 | A | 3/2014 |
| CN | 103650313 | | 3/2014 |
| CN | 103650313 | A | 3/2014 |
| CN | 103650313 | B | 3/2014 |
| CN | 103650314 | A | 3/2014 |
| CN | 103975433 | A | 8/2014 |
| CN | 104011985 | | 8/2014 |
| CN | 104011985 | A | 8/2014 |
| CN | 105229908 | | 1/2016 |
| CN | 105229908 | A | 1/2016 |
| CN | 108964442 | A | 12/2018 |
| CN | 110277908 | | 9/2019 |
| CN | 115580109 | | 1/2023 |
| DE | 2705597 | A1 | 8/1977 |
| DE | 3347106 | A1 | 7/1985 |
| DE | 10358299 | A1 | 7/2005 |
| DE | 112012005353 | | 10/2014 |
| DE | 112013006828 | T5 | 3/2016 |
| EP | 0513920 | A2 | 11/1992 |
| EP | 0773622 | A2 | 5/1997 |
| EP | 1199788 | A1 | 4/2002 |
| EP | 1635444 | B1 | 3/2006 |
| EP | 1750366 | A2 | 2/2007 |
| EP | 2469694 | A1 | 6/2012 |
| EP | 2705597 | A2 | 3/2014 |
| EP | 2705597 | B1 | 8/2018 |
| EP | 3425784 | A1 | 1/2019 |
| FR | 2852748 | A1 | 9/2004 |
| GB | 2232830 | A | 12/1990 |
| GB | 2505371 | A | 2/2014 |
| GB | 2512259 | | 9/2014 |
| GB | 2526492 | | 11/2015 |
| GB | 2526492 | A | 11/2015 |
| GB | 2587732 | | 4/2021 |
| GB | 2588878 | | 5/2021 |
| GB | 2589040 | | 5/2021 |
| JP | H05191970 | A | 7/1993 |
| JP | H0787682 | A | 9/1993 |
| JP | 0787682 | A | 3/1995 |
| JP | 09135567 | A | 5/1997 |
| JP | 10327573 | A | 12/1998 |
| JP | 10327575 | A | 12/1998 |
| JP | H10327573 | A | 12/1998 |
| JP | H10327575 | A | 12/1998 |
| JP | 11235053 | A | 8/1999 |
| JP | H11235053 | A | 8/1999 |
| JP | 2000060110 | A | 2/2000 |
| JP | 2000134095 | A | 5/2000 |
| JP | 2002062858 | A | 2/2002 |
| JP | 2002506609 | A | 2/2002 |
| JP | 2002233139 | A | 8/2002 |
| JP | 2002305248 | A | 10/2002 |
| JP | 2003284324 | A | 10/2003 |
| JP | 3475688 | B2 | 12/2003 |
| JP | 2004187355 | A | 7/2004 |
| JP | 2006025592 | A | 1/2006 |
| JP | 2006050833 | A | 2/2006 |
| JP | 2007215320 | A | 2/2006 |
| JP | 2006067783 | A | 3/2006 |
| JP | 2009513098 | A | 10/2006 |
| JP | 2008118517 | A | 5/2008 |
| JP | 2008220001 | A | 9/2008 |
| JP | 2009022093 | A | 1/2009 |
| JP | 2009165227 | A | 7/2009 |
| JP | 2010045943 | A | 2/2010 |
| JP | 2010521943 | A | 6/2010 |
| JP | 2012157211 | A | 8/2012 |
| JP | 2013034298 | A | 2/2013 |
| JP | 2013065939 | A | 4/2013 |
| JP | 5297116 | B2 | 9/2013 |
| JP | 2014-212654 | | 11/2014 |
| JP | 2014212654 | A | 11/2014 |
| JP | 2019512995 | A | 5/2019 |
| KR | 1019990002891 | A | 1/1999 |
| KR | 20000052068 | A | 8/2000 |
| KR | 1020100023304 | A | 3/2010 |
| KR | 1020100138146 | A | 12/2010 |
| KR | 1020110053681 | A | 5/2011 |
| KR | 1020110061121 | A | 6/2011 |
| KR | 1020120010636 | A | 2/2012 |
| KR | 1020130066266 | A | 6/2013 |
| KR | 1020140015528 | A | 2/2014 |
| KR | 10-2014-0033577 | | 3/2014 |
| KR | 1020140033577 | A | 3/2014 |
| KR | 1020140103351 | | 8/2014 |
| KR | 1020150085072 | A | 7/2015 |
| KR | 101556838 | B1 | 10/2015 |
| KR | 1020150132530 | | 11/2015 |
| KR | 1020200077607 | | 6/2020 |
| KR | 20220098263 | | 7/2022 |
| TW | 200701608 | A | 1/2007 |
| WO | WO2004047303 | A1 | 6/2004 |
| WO | WO2004047303 | A8 | 6/2004 |
| WO | WO2006093600 | A2 | 9/2006 |
| WO | WO2007136919 | A2 | 11/2007 |
| WO | WO2009012900 | A1 | 1/2009 |
| WO | WO2009112900 | A1 | 9/2009 |
| WO | WO2010056912 | A1 | 5/2010 |
| WO | WO2011089483 | A1 | 7/2011 |
| WO | WO2012085598 | A2 | 6/2012 |
| WO | WO 2012/151466 | | 11/2012 |
| WO | WO2012151466 | A2 | 11/2012 |
| WO | WO2012151466 | A3 | 2/2013 |
| WO | WO2013059446 | A1 | 4/2013 |
| WO | WO2013086445 | A1 | 6/2013 |
| WO | WO2013096416 | | 6/2013 |
| WO | WO2013096416 | A1 | 6/2013 |
| WO | WO2014070998 | A1 | 5/2014 |
| WO | WO2014143366 | | 9/2014 |
| WO | WO2014143366 | A1 | 9/2014 |
| WO | WO 2015/138547 | | 9/2015 |
| WO | WO-2017156532 | A1 * | 9/2017 ............. H02M 3/07 |

OTHER PUBLICATIONS

Xiaoguo Liang et al., "Evaluation of Narrow Vdc-Based Power Delivery Architecture in Mobile Computing System," IEEE Transactions on Industry Applications, vol. 47, No. 6: pp. 2539-2548 (Dec. 2011).

Xuan Zhang et al. "A Gan Transistor based 90W AC/DC Adapter with a Buck-PFC Stage and an Isolated Quasi-Switched-Capacitor DC/DC Stage," 2014 IEEE Applied Power Electronics Conference and Exposition—APEC 2014, pp. 109-116 (Mar. 16, 2014).

(56) References Cited

OTHER PUBLICATIONS

Wu Jinn-Chang et al: "A Buck Boost Type Charger with a Switched Capacitor Circuit", Journal of Power Electronics, Jan. 2015, pp. 31-38, vol. 15, Taiwan.

Ilango K et al: "A Hybrid Photovoltaic-Battery Powered DC-DC Converter with High Conversion Ratio and Reduced Switch Stress", 2012 IEEE International Conference on Power Electronics, Drives and Energy Systems, Dec. 16, 2012, 5 pages, Bengaluru, India.

Wood—"Design, Fabrication and Initial Results of a 2g Autonomous Glider" IEEE Industrial Electronics Society, pp. 1870-1877, Nov. 2005, Doc 7598.

Middlebrook—"Transformerless DC-to-DC Converters with Large Conversion Ratios" IEEE Transactions on Power Electronics, vol. 3, No. 4, pp. 484-488, Oct. 1988, Doc 7592.

Han—"A New Approach to Reducing Outpur Ripple in Switched-Capacitor-Based Step-Down DC-DC Converters" IEEE Transactions on Power Electronics, vol. 21, No. 6, pp. 1548-1555, Nov. 2006, Doc 7589.

Abutbul—"Step-Up Switching-Mode Converter with High Voltage Gain Using a Switched-Capacitor Circuit" IEEE Transactions on Circuits and Systems I, vol. 50, pp. 1098-1102, Aug. 2003, Doc 7587.

Umeno—"A New Approach to Low Ripple-Noise Switching Converters on the Basis of Switched-Capacitor Converters" IEEE Intl. Symposium on Circuits and Systems, vol. 2, pp. 1077-1080, Jun. 1991, Doc 7597.

Pilawa-Podgurski—"Merged Two-Stage Power Converter Architecture with Soft Charging Switched-Capacitor Energy Transfer" 39th IEEE Power Electronics Specialists Conference, 2008, Doc 7594.

Pilawa-Podgurski—"Merged Two-Stage Power Converter with Soft Charging Switched-Capacitor Stage in 180 nm CMOS" IEEE Journal of Solid-State Circuits, vol. 47, No. 7, pp. 1557-1567, Jul. 2012, Doc 7595.

Lei—"Analysis of Switched-Capacitor DC-DC Converters in Soft-Charging Operation" 14th IEEE Workshop on Control and Modeling for Power Electronics, p. 1-7, Jun. 23, 2013, Doc 7590.

Axelrod—"Single-switch single stage switched-capacitor buck converter", Proc. Of NORPIE 2004, 4th Nordic Workshop on Power and Industrial Electronics, Jun. 2004, Doc 7588.

Meynard—"Multi-Level Conversion: High Voltage Choppers and Voltage-Source Inverters" IEEE Power Electronics Specialists Conference pp. 397-403, 1992, Doc 7591.

Umeno et al. "A New Approach to Low Ripple-Noise Switching Converters on the Basis of Switched-Capacitor Converters" IEEE International Symposium on Circuits and Systems, vol. 2, pp. 1077-1080, Jun. 1991.

Cheng—"New Generation of Switched Capacitor Converters" PESC 98 Record, 29th Annual IEEE Power Electronics and Motion Control Conference, Wuhan, China, May 17-20, 2009, pp. 1529-1535, 7 pages.

Makowski, "Performance Limits of Switched-Capacitor DC-DC Converters", IEEE PESC'95 Conference, 1995.

Lei et al. "Analysis of Switched-capacitor DC-DC Converters in Soft-charging Operation" 14thIEEE Workshop on Control and Modeling for Power Electronics, pp. 1-7, Jun. 23, 2013.

Han et al. "A New Approach to Reducing Output Ripple in Switched-Capacitor-Based Step-Down DC-DC Converters" IEEE Transactions on Power Electronics, vol. 21, No. 6, pp. 1548-1555 Nov. 2006.

Texas Instruments data sheet for part TPS54310, "3-V to 6-V input, 3—A output synchronous-buck PWM switcher with integrated FETs", dated 2002-2005.

Cao—"Multiphase Multilevel Modular DC-DC Converter for High-Current High-Gain TEG Application" IEEE Transactions on Industry Applications, vol. 47, No. 3, May/Jun. 1991, pp. 1400-1408, 9 pages.

Xu et al., "Voltage Divider and its Application in Two-stage Power Architecture," IEEE Twenty-First Annual IEEE Applied Power Electronics Conference and Exposition, pp. 499-504, Mar. 2006.

Sun et al. "High Power Density, High Efficiency System Two-Stage Power Architecture for Laptop Computers", Power Electronics Specialists Conference, pp. 1-7, Jun. 2006.

Ottman et al., "Optimized Piezoelectric Energy Harvesting Circuit using Step-Down Converter in Discontinuous Conduction Mode", IEEE Power Electronics Specialists Conference, pp. 1988-1994, 2002.

Starzyk et al., "A DC-DC Charge Pump Design Based on Voltage Doublers," IEEE Transactions on Circuits and Systems—I: Fundamental Theory and Applications, vol. 48, No. 3, Mar. 2001, pp. 350-359.

Ng et al. "Switched Capacitor DC-DC Converter: Superior where the Buck Converter has Dominated" PhD Thesis, UC Berkeley, Aug. 17, 2011.

Axelrod et al. "Single-switch single-stage switched-capacitor buck converter", Proc. of NORPIE 2004, 4th Nordic Workshop on Power and Industrial Electronics, Jun. 2004.

Linear Technology data sheet for part LTC3402, "2A, 3MHz Micropower Synchronous Boost Converter", 2000.

Andreassen—"Digital Variable Frequency Control for Zero Voltage Switching and Interleaving of Synchronous Buck Converters" 12th Intl. Power Electronics and Motion Control Conference, IEEE Aug. 2006, pp. 184-188, 5 pages.

R. Pilawa-Podgurski and D. Perreault, "Merged Two-Stage Power Converter with Soft Charging Switched-Capacitor Stage in 180 nm CMOS," IEEE Journal of Solid-State Circuits, vol. 47, No. 7, pp. 1557-1567, Jul. 2012.

Ma et al., "Design and Optimization of Dynamic Power System for Self-Powered Integrated Wireless Sensing Nodes" ACM ISLPED '05 conference (published at pp. 303-306 of the proceedings).

Axelrod et al. "Single-switch single-stage switched-capacitor buck converter", Proc. of NORPIE 2004, 4th Nordic Workshop on Power and Industrial Electronics, Jun. 2004, entire document, pp. 1-5 of pdf submission.

Wai-Shan Ng, et al., "Switched Capacitor DC-DC Converter: Superior where the Buck Converter has Dominated", Electrical Engineering and Computer Sciences University of California at Berkeley, Technical Report No. UCB/EECS-2011-94, http://www.eecs.berkeley.edu/Pubs/TechRpts/2011/EECS-2011-94.html, Aug. 17, 2011, 141 pgs.

Pilawa-Podgurski et al. "Merged Two-Stage Power Converter Architecture with Soft Charging Switched-Capacitor Energy Transfer" 39th IEEE Power Electronics Specialists Conference, 2008.

T. A. Meynard, H. Foch, "Multi-Level Conversion: High Voltage Choppers and Voltage-Source Inverters," IEEE Power Electronics Specialists Conference, pp. 397-403, 1992.

Pal Andreassen et al, Digital Variable Frequency Control for Zero Voltage Switching and Interleaving of Synchronous Buck Converters, 12th International Power Electronics and Motion Control Conference, Aug. 1, 2006, IEEE, Pi Publication date: Aug. 1, 2006.

Dong Cao, Fang Zheng Peng, Multiphase Multilevel Modular DC DC Converter for High-Current High-Gain TEG Application, vol. 47, Nr.: 3, IEEE Transactions On Industry Applications., May 1, 2011, IEEE Service Center, Piscataway, NJ., US, Publication date:May 1, 2011.

Luo et al., "Investigation of switched-capacitorized DC/DC converters," 2009 IEEE 6th International Power Electronics and Motion Control Conference, Wuhan, China, May 17-20, 2009, pp. 1270-1276, doi: 10.1109/IPEMC.2009.5157581.

U.S. Appl. No. 16/919,033: Amended Application Data Sheet filed Jul. 2, 2020, 7 pages.

Cheng, "New generation of switched capacitor converters," PESC 98 Record. 29th Annual IEEE Power Electronics Specialists Conference (Cat. No. 98CH36196), Fukuoka, Japan, May 22, 1998, pp. 1529-1535 vol. 2, doi: 10.1109/PESC.1998.703377.

Cervera et al. "A High Efficiency Resonant Switched Capacitor Converter with Continuous Conversion Ratio," Energy Conversion Congress and Exposition (ECCE), Sep. 2013, pp. 4969-4976.

Y. Lei, R. May and R. Pilawa-Podgurski, "Split-Phase Control: Achieving Complete Soft-Charging Operation of a Dickson Switched-Capacitor Converter," in IEEE Transactions on Power Electronics, vol. 31, No. 1, pp. 770-782, Jan. 2016, doi: 10.1109/TPEL.2015.2403715.

(56) References Cited

OTHER PUBLICATIONS

Alon Cervera et al. 'A high efficiency resonant switched capacitor converter with continuous conversion ratio' Energy Conversion Congress and Exposition, IEEE, 2013, pp. 4969-4976.
U.S. Appl. No. 61/380,522, filed Sep. 7, 2010, Chris Levesque et al.
U.S. Appl. No. 61/417,633, filed Nov. 29, 2010, Chris Levesque et al.
Markowski, "Performance Limits of Switched-Capacitor DC-DC Converters", IEEE PESC'95 Conference, 1995.
Andreassen—"Digital Variable Frequency Control for Zero Voltage Switching and Interleaving of Synchronous Buck Converters" 12th Intl. Power Electronics and Motion Control Conference, IEEE Aug. 2006, pp. 184-188, 5 pages, Doc 7043.
Pilawa-Podgurski et al. "Merged Two-Stage Power Converter Architecture with Soft Charging Switched-Capacitor Energy Transfer" 39th IEEE Power Electronics Specialists Conference, 2008, pp. 4008-4015.
Xiaoguo Liang et al., Evaluation of Narrow Vdc-Based Power Delivery Architecture in Mobile Computing System, IEEE Transactions on Industry Applications., Nov. 1, 2011, IEEE Service Center, Piscataway, NJ., US.
O. Abutbul et al. "Step-Up Switching-Mode Converter With High Voltage Gain Using a Switched-Capacitor Circuit" IEEE Transactions on Circuits and Systems I., vol. 50, pp. 1098-1102, Aug. 2003.
Sun—"High Power Density, High Efficiency System Two-Stage Power Architecture for Laptop Computers" Power Electronic Specialists Conference, pp. 1-7, Jun. 18, 2006, Doc 7596.
Luo—"Investigation of Switched-Capacitorized DC/DC Converters" 2009 IEEE 6th Intl. Power Electronics and Motion Control Conference, Wuhan, China, May 17-20, 2009, pp. 1270-1276, 7 pages, Doc 7050.
Cheng—"New Generation of Switched Capacitor Converters" PESC 98 Record, 29th Annual IEEE Power Electronics and Motion Control Conference, Wuhan, China, May 17-20, 2009, pp. 1529-1535, 7 pages, Doc 7049.
Cao—"Multiphase Multilevel Modular DC-DC Converter for High-Current High-Gain TEG Application" IEEE Transactions on Industry Applications, vol. 47, No. 3, May/Jun. 1991, pp. 1400-1408, 9 pages, Doc 7042.
Wood et al., "Design, Fabrication and Initial Results of a 2g Autonomous Glider" IEEE Industrial Electronics Society, pp. 1870-1877, Nov. 2005.
R. D. Middlebrook, "Transformerless DC-to-DC Converters with Large Conversion Ratios" IEEE Transactions on Power Electronics, vol. 3, No. 4, pp. 484-488, Oct. 1988.
Yeung, "Multiple Fractional Voltage Conversion Ratios for Switched Capacitor Resonant Converters", Jun. 1, 2001.
David Giuliano, "Miniaturized, low-voltage power converters with fast dynamic response" Thesis (Ph. D.)—Massachusetts Institute of Technology, Department of Electrical Engineering and Computer Science, 2013.

* cited by examiner

| Item | Total Value | Comp. Size (W x L x H) | Quantity |
|---|---|---|---|
| L1 | 120 nH | 4.00 x 4.00 x 1.20mm$^3$ | 1 |
| C0 | 40 µF | 1.60 x 0.80 x 1.00mm$^3$ | 8 |
| C1 | 10 µF | 2.00 x 1.25 x 1.25mm$^3$ | 2 |
| C2 | 10 µF | 2.00 x 1.25 x 1.25mm$^3$ | 2 |
| C3 | 10 µF | 2.00 x 1.25 x 1.25mm$^3$ | 1 |
| C4 | 10 µF | 2.00 x 1.25 x 1.25mm$^3$ | 1 |

*FIG. 5*

| V2 | S1 | S2 | S3 | 1st Stage | 2nd Stage |
|---|---|---|---|---|---|
| 5 V | OFF | OFF | ON | ON | ON |
| 10 V | OFF | ON | OFF | ON | OFF |
| 20 V | ON | OFF | OFF | OFF | OFF |

*FIG. 7*

| Item | Required Total Value | Comp. Size (W x L x H) | Total Area |
|---|---|---|---|
| L1 | 30 nH | 4.00 x 4.00 x 1.20$mm^3$ | 1 x 16.00 $mm^2$ |
| C1 | 10 µF | 2.00 x 1.25 x 1.25$mm^3$ | 2 x 2.50 $mm^2$ |
| C2 | 10 µF | 2.00 x 1.25 x 1.25$mm^3$ | 2 x 2.50 $mm^2$ |
| C0 | 15 µF | 2.00 x 1.25 x 1.25$mm^3$ | 3 x 2.50 $mm^2$ |

*FIG. 17*

BATTERY MANAGEMENT SYSTEM WITH ADIABATIC SWITCHED-CAPACITOR CIRCUIT

RELATED APPLICATIONS

This application claims the benefit of the Mar. 11, 2016 priority date of U.S. Provisional Application 62/306,749, the contents of which are herein incorporated by reference.

FIELD OF INVENTION

This invention relates to power conversion, and in particular, to battery-managers that use switched-capacitors.

BACKGROUND

Many portable electrical devices are used while the device is plugged into an AC source. During this time, a battery manager must provide power to both charge the battery, if necessary, and to operate the device itself. When the AC source is disconnected, the battery manager must switch over so that the battery provides power to the device.

SUMMARY

In one aspect, the invention features an apparatus for switching between powering a load from a battery and powering the load from an AC source. Such an apparatus includes a battery manager with an AC/DC converter connected to its input. Either the AC/DC converter or the battery manager includes an adiabatic switched-capacitor network. Such a network is characterized by having a capacitor with charge stored thereon circuitry for constraining a rate of change of the charge at least in part as a result of causing charge to pass through an inductance.

In another aspect, the invention features an apparatus for switching between powering a load using energy stored in a battery and powering the load using energy from an AC source, the apparatus comprising a battery manager, a switched-capacitor network, a battery charger for charging the battery while the load is being powered using energy from the AC source, and a first controller, wherein the battery manager comprises an input terminal for coupling to a bridge rectifier, wherein the switched-capacitor network comprises a plurality of capacitors and first and second switch sets, wherein closing switches in the first switch set and opening switches in the second switch set arranges the capacitors into a first state, wherein closing the switches in the second set and opening the switches in the first set arranges the capacitors in a second state, and wherein, in operation, the controller causes the switched-capacitor network to transition between the first state and the second state at a specific frequency, thereby transferring charge between capacitors and terminals of the switched-capacitor network.

In some embodiments, the switched-capacitor network is in the AC/DC converter. Among these are embodiments in which the switched-capacitor network includes a controller, a charge pump, and a switching regulator connected to the charge pump and to a bridge rectifier. In these embodiments, the controller controls the switching regulator and the charge pump.

In other embodiments, the AC/DC converter is part of the battery manager. There are a variety of locations in which one can place the switched-capacitor network within a battery manager.

In one of these embodiments, the battery manager comprises an input connected to the AC/DC converter, and a step-down converter. In these embodiments, the switched-capacitor network is between the step-down converter and the input.

In another of these embodiments, the battery manager comprises, in addition to a step-down converter, an input connected to the AC/DC converter, an output connected to a load, a first line that connects the input to the output, a second line that connects the step-down converter to the first line at a first node, a third line that connects the switch to the first line at a second node, and a switch that selectively connects and disconnects the battery from the first line. In these embodiments, the switched-capacitor network is on the first line between the first and second nodes.

In another of these embodiments, the battery manager includes, in addition to a step-down converter and a battery charger, a first line extending between the step-down converter and an output to which a load to be driven is to be connected, and a second line that connects the battery charger to the first line at a first node. In these embodiments, the switched-capacitor network is disposed between the first node and the step-down converter.

In another of these embodiments, the battery manager includes, in addition to a step-down converter, a first line that extends from battery manager's input to its output, and a second line that connects the step-down converter to the first line at a node. In these embodiments, switched-capacitor network is disposed between the battery manager's input and the node.

In another of these embodiments, the battery step-down converter has an inductance upon the switched-capacitor network relies to limit a rate of change of charge present on a capacitor within the switched-capacitor network.

Further embodiments include those in which the switched-capacitor network comprises a charge pump, a switching regulator connected to the charge pump, and a controller that controls the switching regulator and the charge pump so as to achieve operation thereof.

In any of the foregoing embodiments, it is possible for the switched-capacitor network to include a charge pump and an inductance coupled to the charge pump. Among these are embodiments in which the charge pump comprises a cascade multiplier.

In another aspect, the invention features an apparatus for switching between powering a load from a battery and powering it load from a DC source. Such an apparatus includes a battery manager having an switched capacitor network that includes a capacitor having an amount of charge stored thereon, and circuitry for constrains a rate at which the amount of charge is changed at least in part as a result of causing charge to pass through an inductance.

Among these embodiments are those in which the battery manager includes an input, and a step-down converter with the switched-capacitor network between them.

Also among these embodiments are those in which the battery manager includes an input, an output, a first line, a second line, a third line, a step-down converter, and a switch. In these embodiments, the output is configured to be connected to a load that is to be driven, the input is connected to a DC source, the switch selectively connects and disconnects the battery from the first line, the first line connects the input to the output, the second line connects the step-down converter to the first line at a first node, wherein the third line connects the switch to the first line at a second node, and the switched-capacitor network is on the first line between the first and second nodes.

In yet other embodiments, the battery manager includes a first line, a second line, an output to which a load to be driven is to be connected, a battery charger, and a step-down converter. In these embodiments, the first line extends between the step-down converter and the output, the second line connects the battery charger to the first line at a first node, and the switched-capacitor network is disposed between the first node and the step-down converter.

In some embodiments, the battery manager comprises the battery charger and a step-down converter. Among these are embodiments in which the step-down converter is disposed such that, in operation, energy for charging the battery and energy for powering the load both pass through the step-down converter, and other embodiments in which it is instead disposed such that, in operation, energy for charging the battery passes through the step-down converter and energy for powering the load bypasses the step-down converter.

Also among the embodiments are those that include a bypass switch control circuit to control slew rate of voltage transitions in the switched-capacitor circuit.

In still other embodiments, the battery manager includes an input, an output, a step-down converter, a first line, and a second line. In such embodiments, the first line extends from the input to the output, the second line connects the step-down converter to the first line at a node, and the switched-capacitor network is disposed between the input and the node.

Still other embodiments are those in which the battery manager includes a step-down converter. In these embodiments, the step-down converter includes an inductance, and the switched-capacitor network relies on the inductance of the step-down converter to limit a rate of change of charge present on a capacitor within the switched-capacitor network.

Yet other embodiments include a travel charger, with the battery manager being a constituent thereof.

Among any of the foregoing embodiments are those in which the switched-capacitor network includes a charge pump and an inductance coupled to the charge pump. These include embodiments in which the charge pump includes a cascade multiplier. Also among the foregoing embodiments are those in which the switched-capacitor network is adiabatic and those in which it is diabatic.

These and other features of the invention will be apparent from the following detailed description and the accompanying figures, in which:

BRIEF DESCRIPTION OF THE FIGURES

FIG. 5 is a parts list for the embodiment shown in FIG. 3;

FIG. 7 shows operation of switches shown in FIG. 5 for controlling slew rate;

FIG. 17 shows exemplary components for implementing an adiabatic switched-capacitor circuit;

DETAILED DESCRIPTION

Before describing several exemplary embodiments of power converter circuits and processing performed by and on such power converter circuits, it should be appreciated that, in effort to promote clarity in explaining the concepts, reference is sometimes made herein to specific switched-capacitor circuits or specific switched-capacitor circuit topologies. It should be understood that such references are merely exemplary and should not be construed as limiting.

As used herein, ac-dc converters are the same as AC/DC converters; and switched-capacitor circuits are the same as switched-capacitor networks and charge pumps.

Figure 1:
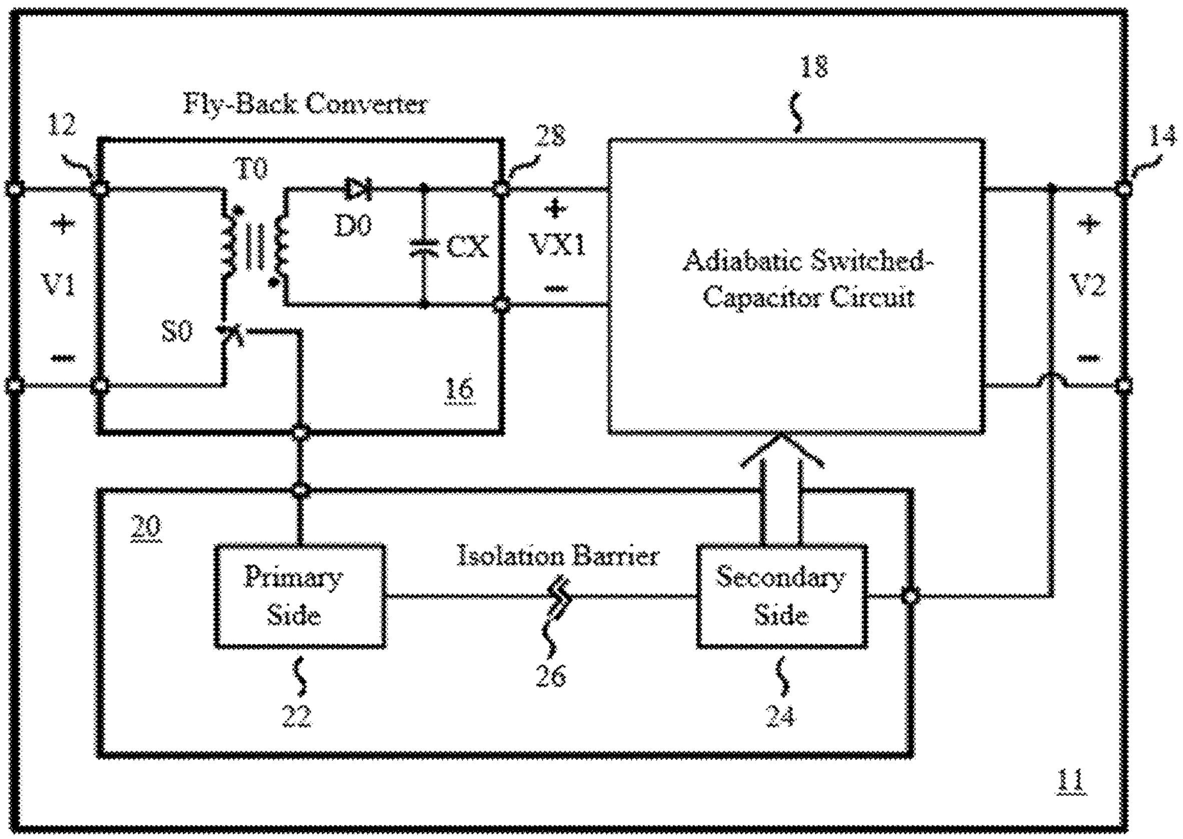
FIG. 1 shows a two-stage power conversion circuit.

FIG. 1 shows a two-stage power conversion circuit 11 having a first terminal 12 that connects to a first stage and a second terminal 14 that connects to a second stage. The first terminal 12 is at a first voltage V1 and the second terminal 14 is at a second voltage V2.

In the illustrated embodiment, the first stage is implemented as a switch-mode pre-regulator 16 and the second stage is implemented as an adiabatic switched-capacitor circuit 18. However, in alternative embodiments, this second stage is non-adiabatic, or diabatic.

The pre-regulator 16 can be implemented in a variety of ways, so long as the essential function thereof, namely regulation of an output voltage, can be carried out. In the illustrated embodiment, the pre-regulator 16 includes a pre-regulator switch S0, a transformer T0, a diode D0, and a filter capacitor CX. A particularly useful implementation of a pre-regulator 16 is a magnetically-isolated converter, an example of which is a fly-back converter.

A variety of fly-back converters can be used to implement the pre-regulator 16. These include a quasi-resonant fly-back converter, an active-clamp fly-back converter, an interleaved fly-back converter, and a two-switch fly-back converter.

Other examples of magnetically-isolated converters are forward converters. Examples of suitable forward converters include a multi-resonant forward converter, an active-clamp forward converter, an interleaved forward converter, and a two-switch forward converter.

Yet other examples of magnetically-isolated converters are half-bridge converters and full-bridge converters. Examples of half-bridge converters include an asymmetric half-bridge converter, a multi-resonant half-bridge converter, and an LLC resonant half-bridge converter. Examples of full-bridge converters include an asymmetric full-bridge converter, a multi-resonant full-bridge converter, and an LLC resonant full-bridge converter.

It is also possible to implement the pre-regulator 16 using a non-isolated converter. Examples include a buck converter, a boost converter, and a buck-boost converter.

As used herein, two functional components are said to be "isolated," or more specifically, "galvanically isolated," if energy can be communicated between those components without a direct electrical conduction path between those components. Such isolation thus presupposes the use of another intermediary for communicating energy between the two components without having actual electrical current flowing between them. In some cases, this energy may include information.

Examples include the use of a wave, such as an electromagnetic, mechanical, or acoustic wave. As used herein, electromagnetic waves include waves that are in span the visible range, the ultraviolet range, and the infrared range. Such isolation can also be mediated through the use of quasi-static electric or magnetic fields, capacitively, inductively, or mechanically.

Most functional components have circuitry in which different parts of the circuit are at different electrical potentials. However, there is always a potential that represents the lowest potential in that circuit. This is often referred to as "ground" for that circuit.

When a first and second functional component are connected together, there is no guarantee that the electrical potential that defines ground for the first component will be the same as the electrical potential that defines ground for the second circuit. If this is the case, and if these components are connected together, it will be quite possible for electrical current to flow from the higher of the two grounds to the lower of the two grounds. This condition, which is called a "ground loop," is undesirable. It is particularly undesirable if one of the two components happens to be a human being. In such cases, the current in the ground loop may cause injury.

Such ground loops can be discouraged by galvanically isolating the two components. Such isolation essentially forecloses the occurrence of ground loops and reduces the likelihood that current will reach ground through some unintended path, such as a person's body.

The switched-capacitor circuit 18 can be implemented as a switched-capacitor network. Examples of such networks include ladder networks, Dickson networks, Series-Parallel networks, Fibonacci networks, and Doubler networks. These can all be adiabatically charged and configured into multiphase networks. A particularly useful switched-capacitor network is an adiabatically charged version of a full-wave cascade multiplier. However, diabatically charged versions can also be used.

As used herein, changing the charge on a capacitor "adiabatically" means causing an amount of charge stored in that capacitor to change by passing the charge through a non-capacitive element. A positive adiabatic change in charge on the capacitor is considered adiabatic charging while a negative adiabatic change in charge on the capacitor is considered adiabatic discharging. Examples of non-capacitive elements include inductors, magnetic elements, resistors, and combinations thereof. In either case, the result is a constraint on the rate at which the quantity of charge on the capacitor can change.

In some cases, a capacitor can be charged adiabatically for part of the time and diabatically for the rest of the time. Such capacitors are considered to be adiabatically charged. Similarly, in some cases, a capacitor can be discharged adiabatically for part of the time and diabatically for the rest of the time. Such capacitors are considered to be adiabatically discharged.

Diabatic charging includes all charging that is not adiabatic and diabatic discharging includes all discharging that is not adiabatic.

As used herein, an "adiabatic switched-capacitor circuit" is a network having at least one capacitor that is both adiabatically charged and adiabatically discharged. A "diabatic switched-capacitor circuit" is a network that is not an adiabatic switched-capacitor circuit.

Examples of pre-regulators 16, switched-capacitor circuits 18, their accompanying circuitry, and packaging techniques can be found U.S. Pat. Nos. 9,362,826, 9,497,854, 8,723,491, 8,503,203, 8,693,224, 9,502,968, 8,619,445, 9,203,299, and 9,041,459, U.S. Patent Publications 2016/0197552, 2015/0102798, 2014/0301057, 2013/0154600, 2015/0311786, 2014/0327479, 2016/0028302, 2014/0266132, 2015/0077175, and 2015/0077176, and PCT publications WO2014/062279, WO2015/138378, WO2015/138547, WO2016/149063, and WO 2017/007991, the contents of which are herein incorporated by reference.

Adiabatic switched-capacitor circuits are described in detail in U.S. Pat. No. 8,860,396, issued Oct. 14, 2014, in U.S. Provisional Applications 62/132,701 and 62/132,934, both of which were filed on Mar. 13, 2015. The contents of the foregoing documents are incorporated herein by reference.

A first controller 20 controls the operation of the first and second stages. The first controller 20 includes a primary side 22 that controls the first stage and a secondary side 24 that controls the second stage. An isolation barrier 26 separates the primary side 22 from the secondary side 24.

The primary side 22 of the first controller 20 controls the pre-regulator switch S0. Opening and closing the pre-regulator switch S0 controls the current provided to a primary side of the transformer T0. This, in turn, controls the voltage across the filter capacitor CX. When the pre-regulator switch S0 is on, the diode D0 is off and when the pre-regulator switch S0 is off, the diode D0 is on.

The pre-regulator 16 also includes a regulator-output terminal 28 maintained at an intermediate voltage VX1 that is lower than the first voltage V1. This regulator-output terminal 28 connects to the adiabatic switched-capacitor circuit 18. The adiabatic switched-capacitor circuit 18 thus receives this intermediate voltage VX1 and transforms it into the second voltage V2.

The adiabatic switched-capacitor circuit 18 operates in discrete steps. Thus, it only provides coarse regulation of its output. It cannot provide fine regulation of its output. It is for the pre-regulator 16 to carry out this fine regulation. The two-stage design shown in FIG. 1 reduces the need for the pre-regulator 16 to sustain a high-current burden. This means that the secondary winding of the transformer T0 can instead carry a much smaller RMS current. This, in turn, lowers winding loss and reduces the voltage ripple at the regulator-output terminal 28. It also means that the filter capacitor CX that couples the pre-regulator 16 to the adiabatic switched-capacitor circuit 18 can be made smaller.

However, the improved performance of the pre-regulator 16 cannot be completely offset by the increased size and power loss of having the adiabatic switched-capacitor circuit 18 in the second stage. Therefore, it is imperative that the adiabatic switched-capacitor circuit 18 be both extremely efficient and small.

The two-stage power conversion circuit 11 in FIG. 1 is shown as being configured to receive a DC voltage. In an alternative embodiment shown in FIG. 2, a bridge rectifier 65 coupled to the first terminal 12 by a coupling capacitor CB provides a way to receive an AC voltage VAC.

Figure 2:
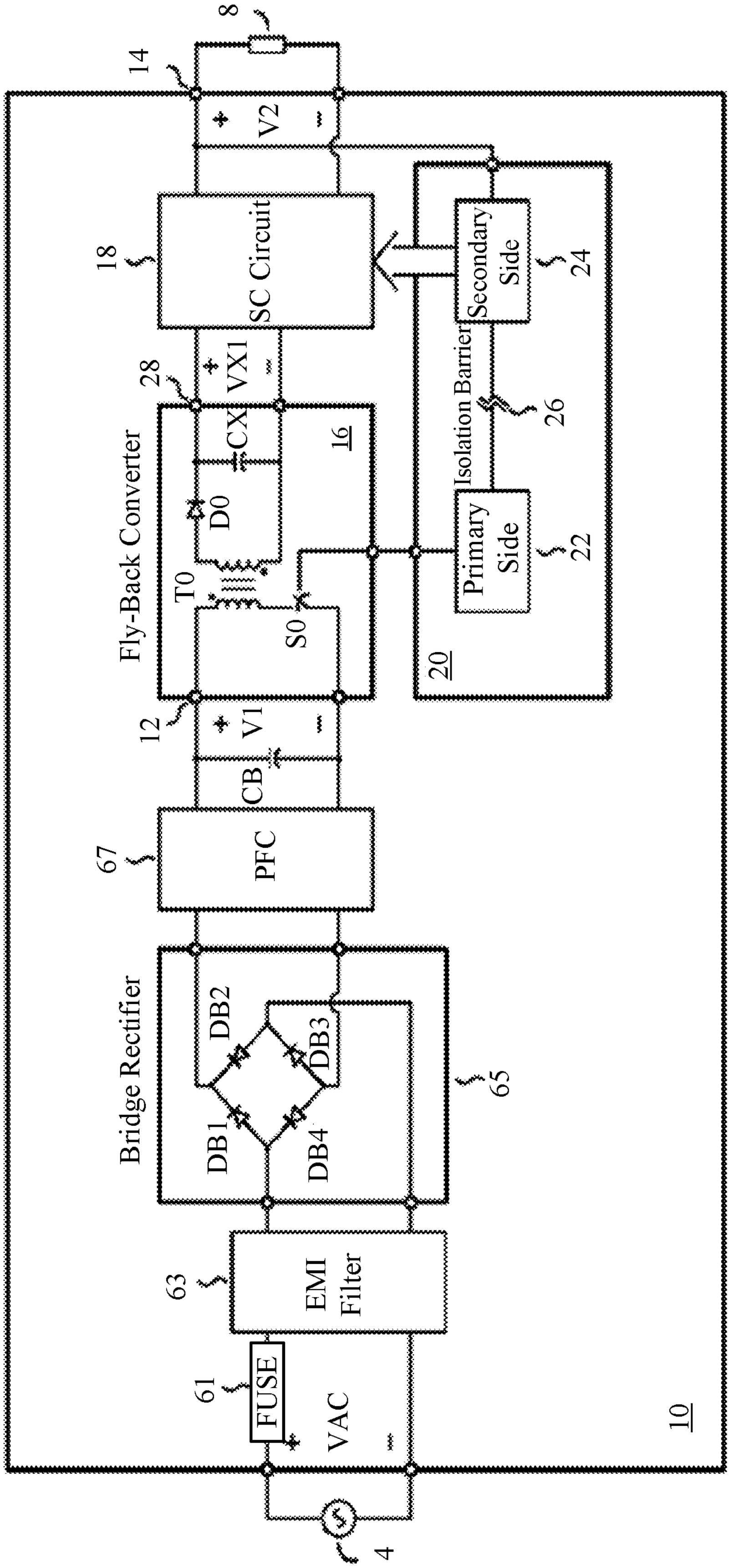
FIG. 2 shows the circuit of FIG. 1 with additional circuitry for receiving an AC voltage.
Figure 22:
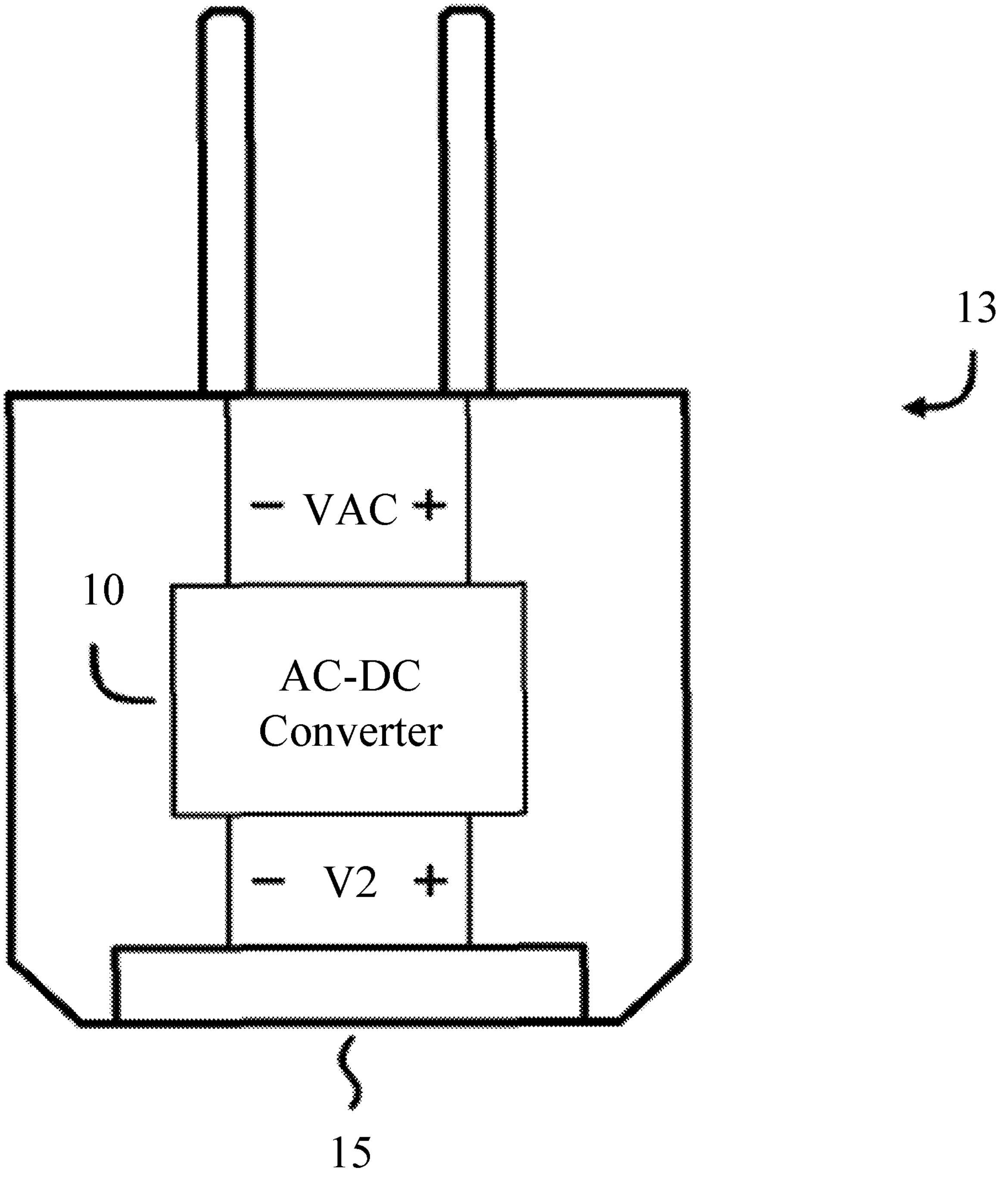
FIG. 22 shows the circuit of FIG. 2 incorporated into a travel adapter.

The power conversion circuit 10 of FIG. 2 is similar to that shown in FIG. 1, but with additional circuitry for receiving an AC voltage VAC provided by an AC source 4 and converting that AC voltage VAC into the second voltage V2. The AC voltage VAC is provided to input terminals of a bridge rectifier 65 having bridge diodes DB1, DB2, DB3, and DB4 arranged to form a bridge and having an output across a bridge capacitor CB. The output across the bridge capacitor CB becomes the first voltage V1 presented at the first terminal 12. A power-conversion circuit 10 of this type may be incorporated into a travel adapter 13, as shown in FIG. 22. Such a travel adapter 13 outputs a DC voltage at a USB port 15.

Some embodiment include circuitry for controlling harmonic current and thus boosting the ratio of real power to apparent power that flows through the power supply. This is particularly useful for power supplies that attach to a wall outlet that supplies an AC voltage. An example of such circuitry is an active power-factor corrector 67 disposed between the bridge rectifier 65 and the pre-regulator 16.

FIG. 2 also shows a fuse 61 between the AC power source 4 and the remaining components of the power-conversion circuit 10 for safety. An electromagnetic interference filter 63 is also provided to suppress the uncontrolled emission of electromagnetic waves that may arise during operation of the power-conversion circuit 10.

Figure 3:
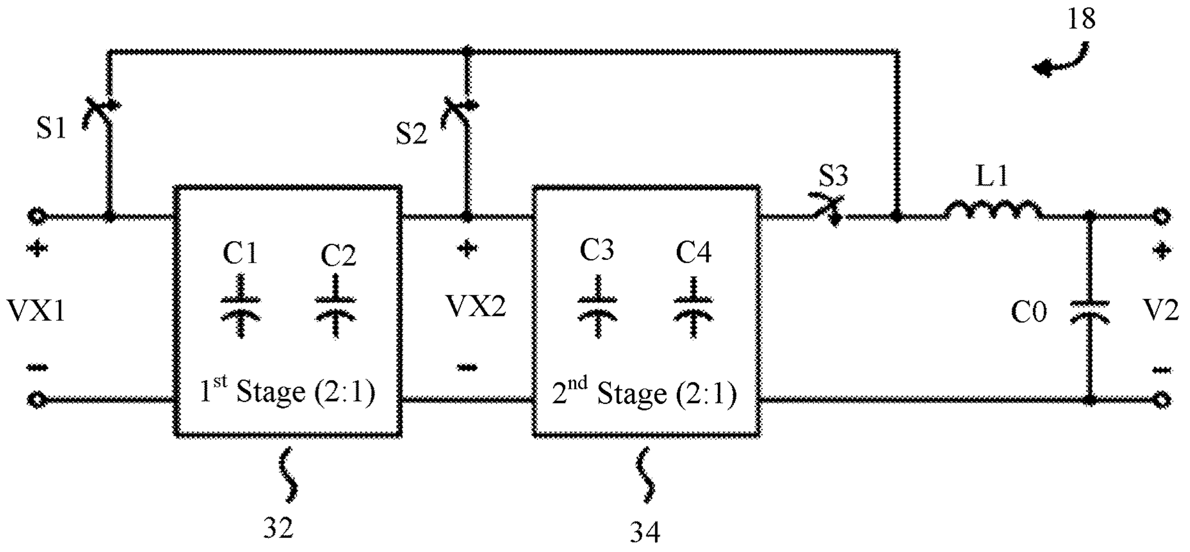
FIG. 3 shows a first embodiment of a switched-capacitor architecture for use in the power-conversion circuits of FIGS. 1 and 2.

FIG. 3 shows a first embodiment of a switched-capacitor circuit 18 that is designed to accept a nominal voltage of 20 volts and to produce a variety of output voltages, such as 5 volts and 10 volts. This is particularly useful for Type-C travel adapters. This is because, unlike the older USB standards, in which the output is always five volts, the newer USB Type C standard permits higher output voltages, such as ten, fifteen, and even twenty volts.

FIG. 3 shows a first embodiment of an adiabatic switched-capacitor circuit 18 that is designed to accept a nominal voltage of 20 volts. The illustrated adiabatic switched-capacitor circuit 18 features a first switched-capacitor stage 32, a second switched-capacitor stage 34, a first bypass switch S1, a second bypass switch S2, and a third bypass switch S3. An LC filter having an output inductor L1 and an output capacitor C0 permit adiabatic operation. By selectively opening and closing the bypass switches S1, S2, S3, it is possible to selectively bypass selected ones of the first and second switched-capacitor stages 32, 34.

Each of the first and second stages 32, 34 is a 2× voltage divider having a maximum voltage conversion from VX1 to VX2 of 4:1. The resulting adiabatic switched-capacitor circuit 18 is designed to accept an intermediate voltage VX1 of 20 volts and to provide a voltage of either 20 volts, 10 volts, or 5 volts. Some embodiments deliver a 15-volt output voltage, which is sometimes required by the Type-C standard. This can be provided by having the pre-regulator 16 deliver 15 volts to the switched-capacitor circuit 18 instead of 20 volts and running the switched-capacitor circuit 18 in the 1:1 mode.

The adiabatic switched-capacitor circuit 18 shown in FIG. 3 has three modes of operation, a 1:1 mode, a 2:1 mode, and a 4:1 mode. In the 1:1 mode, the first bypass switch S1 closes, and the second and third bypass switches S2 and S3 open. In the 2:1 mode, the second bypass switch S2 closes and the first and third bypass switches S1 and S3 open. In the 4:1 mode, the third bypass switch S3 closes and the first and second bypass switches S1 and S2 open. All bypassed stages run in a low-power mode to save power since they are not needed to provide voltage conversion (i.e., they are not switching at a specific frequency).

Figure 4:
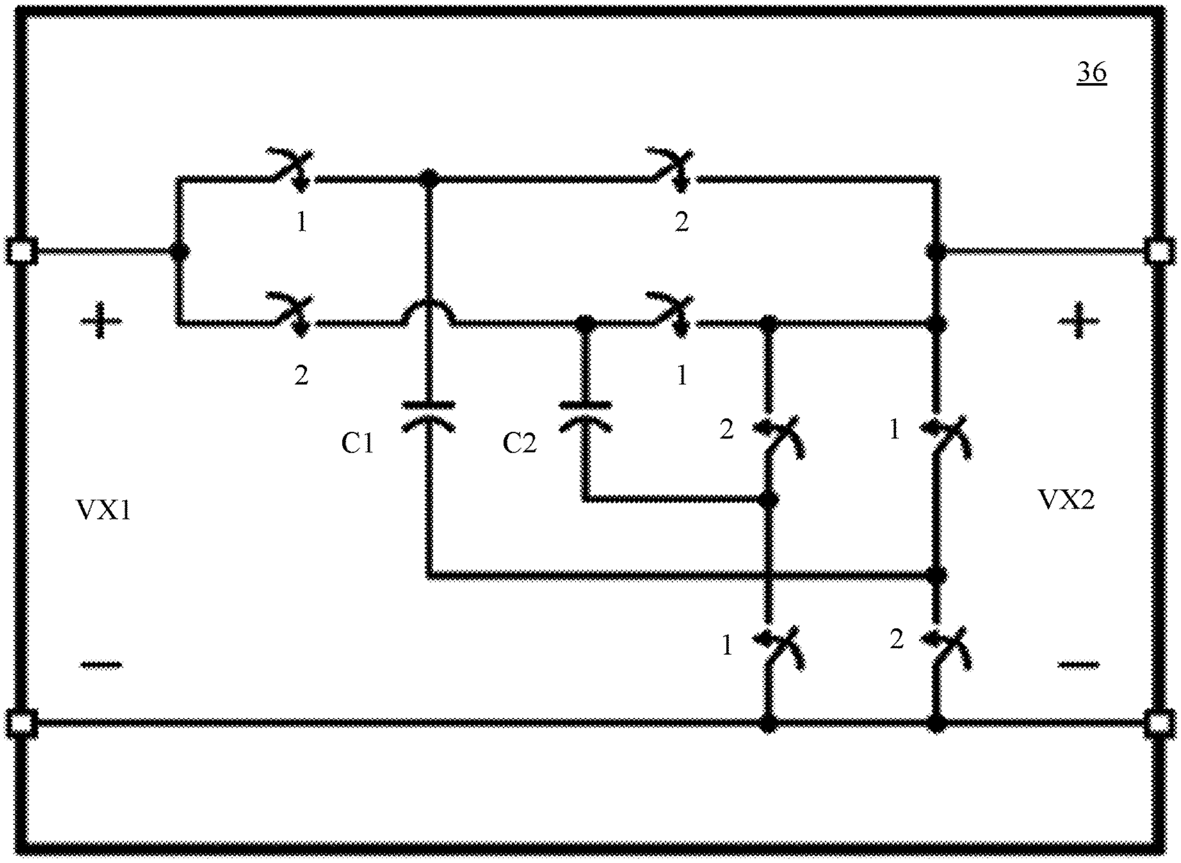
FIG. 4 shows a switching circuit contained in the stages of the power conversion circuit of FIG. 3.

FIG. 4 illustrates a switched-capacitor circuit 36 inside the first stage 32. A similar circuit is within the second stage 34. During operation, this circuit transitions between first and second states. In the first state, all switches labeled “1” close and all switches labeled “2” open. In the second state, all switches labeled “1” open and all switches labeled “2” close. The switched-capacitor circuit 36 alternates between the first and second state at a specific frequency. This frequency is one that is selected to produce a second intermediate voltage VX2 that is half of the intermediate voltage VX1.

FIG. 5 shows a component list for one implementation of the adiabatic switched-capacitor circuit 18 shown in FIG. 3. The components were selected so the solution provides a high efficiency, a small solution size, and a maximum output voltage ripple of 100 mV peak-to-peak. The total value column specifies the total amount of inductance and/or capacitance required of the components at their operating condition.

In an alternative embodiment, the first and second bypass switches S1, S2 can be turned on and off in such a way that the second voltage V2 slews up and down in a controlled manner. This is particularly useful when there is a maximum slew rate to be met. For example, in the case of a Type-C USB power adapter, where the second voltage V2 is programmable from 5 volts to 20 volts, there is a maximum slew-rate requirement of 30 mV/μs for voltage transitions.

Figure 6:
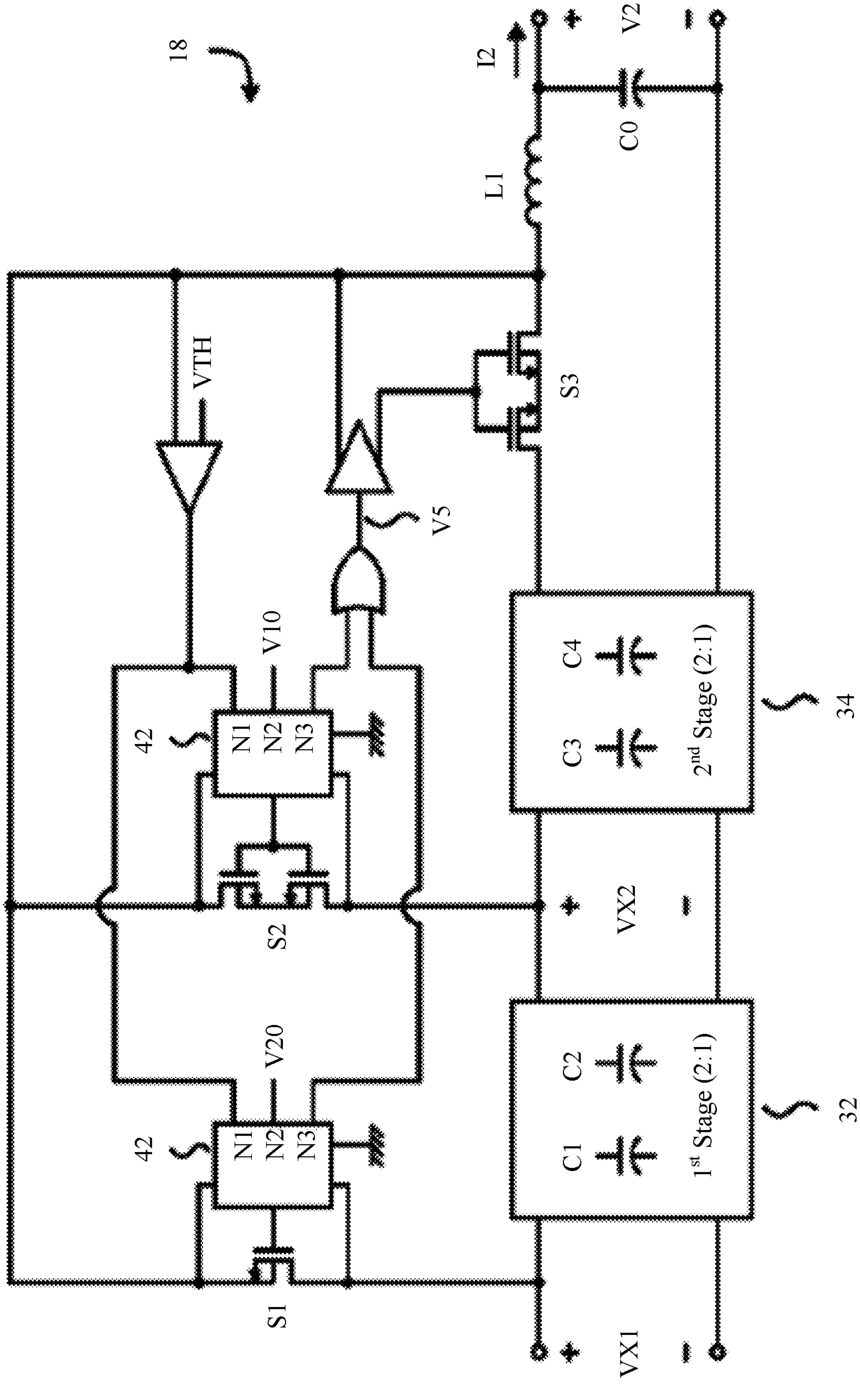
FIG. 6 is a variant of the switched-capacitor architecture of FIG. 3 with circuitry for controlling slew rate.

FIG. 6 shows an alternative embodiment of the adiabatic switched-capacitor circuit 18 of FIG. 3 in which first and second bypass switch control circuits 42 are added to control the slew rate of voltage transitions in the adiabatic switched-capacitor circuit 18 shown in FIG. 3. These bypass switch control circuits 42 control the slew rate of voltage transitions in the adiabatic switched-capacitor circuit 18 shown in FIG. 3 when the output transitions from 5 volts to 10 volts and from 5 volts to 20 volts. The bypass switch control circuit 42 also controls the second voltage V2 slew-rate from 10 volts to 5 volts and 20 volts to 5 volts.

FIG. 7 shows a table of bypass switch states for three different voltage outputs.

Referring to FIG. 6, to output 20 volts, one asserts a first control input V20. To output only 10 volts, one asserts a second control input V10. By default, when neither the first nor the second output is asserted, the adiabatic switched-capacitor circuit 18 outputs 5 volts.

Figure 8:
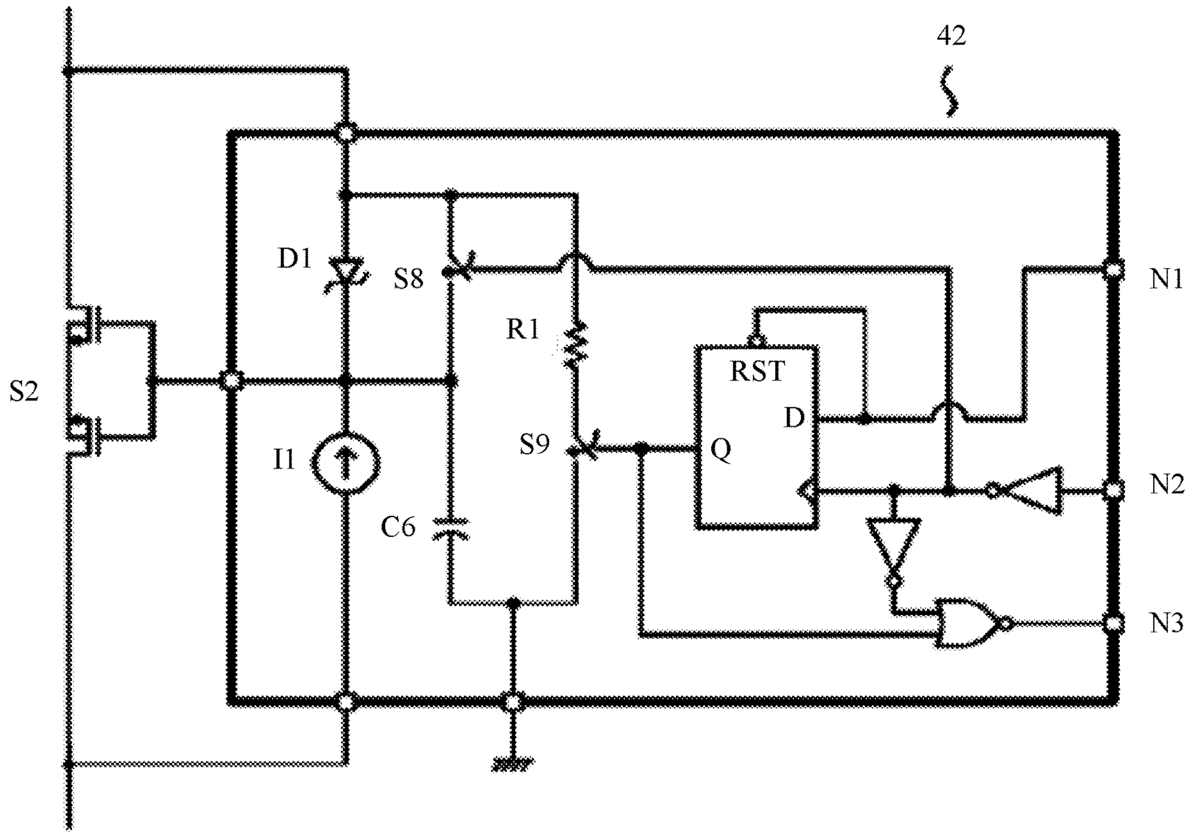
FIG. 8 shows details of a slew-rate control circuit from the switched-capacitor architecture shown in FIG. 6.

FIG. 8 shows details of a bypass switch control circuit 42 shown in FIG. 6. Although the second bypass switch S2 is shown in FIG. 8, the first bypass switch S1 is controlled in a similar way. All of the bypass switches S1, S2, and S3 are N-channel FETs (NFETs). The composite back-to-back NFET configuration for the second and third bypass switches S2, S3 is necessary to block the flow of reverse current from the output to the input when these switches are off while the first bypass switch S1 is on. Although the second and third bypass switches S2, S3 are depicted as discrete back-to-back NFETs in FIG. 8, these devices may be replaced by a single transistor with an adaptive body switch in a fully integrated solution.

A first slew-control switch S8 in FIG. 8 turns off the first and second bypass switches S1, S2 by shorting their gate and source terminals. When either the first bypass switch S1 or the second bypass switch S2 is turned on, the first slew-control switch S8 (in the respective control) circuit opens, and the second voltage V2 transitions from 5 volts to 10 volts or from 5 volts to 20 volts. Meanwhile, an anti-slewing capacitor C6 and a constant current source I1 control the upward slew rate of the second voltage V2 transition from 5 volts to 10 volts or 20 volts.

When the first and second bypass switches S1, S2 are turned off and the second voltage V2 transitions from 10 volts to 5 volts or 20 volts to 5 volts, a second slew-control switch S9 turns on and allows a bleeder resistor R1 to discharge the anti-slewing capacitor C6. This controls the downward slew rate of the second voltage V2.

A comparator in FIG. 6 detects when the second voltage V2 has dropped below a certain threshold VTH (e.g., VTH=5.25 V) and terminates the discharge of the anti-slewing capacitor C6 by opening the second slew-control switch S9. Note that the bleeder resistor R1 may be replaced by a current source, and the slew rates of both positive and negative voltage transitions may be programmed by making the current source I1, the bleeder resistor R1, and the anti-slewing capacitor C6 be programmable or reconfigurable.

When 20 volts is desired at the output, the second and third bypass switches S2, S3 are off while the first bypass switch S1 is on. The first and second (2:1) switched-capacitor stages are also off. The first bypass switch S1 is an N-channel FET (NFET) whose turn-on is controlled by the current source I1, which is a constant current source, and the anti-slewing capacitor C6 such that the second voltage V2 slews up at a fixed rate.

During the 5-volt to 20-volt transition, the first and second slew-control switches S8, S9 are open and the first bypass switch S1 acts as a source-follower. In this configuration, the voltage on the source of the first bypass switch S1 follows the voltage on its gate, which is given by the current though the current source I1 divided by the capacitance of the anti-slewing capacitor C6. Initially, when the first bypass switch S1 turns on and the second voltage V2 slews up, the first bypass switch S1 operates in the saturation region (i.e., $V_{DS}>V_{GS}-V_T$, where $V_T$ is the NFET's threshold voltage). As the output approaches its final level, the first bypass switch S1 transitions into the linear region and acts as a low-impedance switch. A Zener diode D1 clamps the gate-to-source voltage ($V_{GS1}$) of the bypass switch S1 to a safe level (e.g., $V_{GS1}$ equals 5 volts) during steady-state operation. The transition from 20 volts back to 5 volts is controlled by the bleeder resistor R1, which discharges the output capacitance in a slew-rate controlled manner.

When 10 volts is desired at the output, the first and third bypass switches S1, S3 are off while the second bypass switch S2 is on. The first (2:1) switched-capacitor stage is on and the second switched-capacitor stage is off. The second bypass switch S2 includes back-to-back NFETs, that operate as a source follower when the second voltage V2 transitions from 5 volts to 10 volts. As described previously, the current source I1 and anti-slewing capacitor C6 control the slew rate of the second voltage V2 as it transitions from 5 volts to 10 volts, the bleeder resistor R1 controls the transition from 10 volts back to 5 volts, and the Zener diode D1 clamps the gate-to-source voltage of the second bypass switch S2 to a safe level during steady-state operation at 10 volts (i.e. V2).

Although not explicitly shown in FIGS. 6 and 8, it should be understood by those skilled in the art that additional circuitry is useful to protect the system against various single-point failures and fault conditions such as over-current, over-temperature, and over-voltage on any and all nodes, switches, and passive components.

Figure 9:
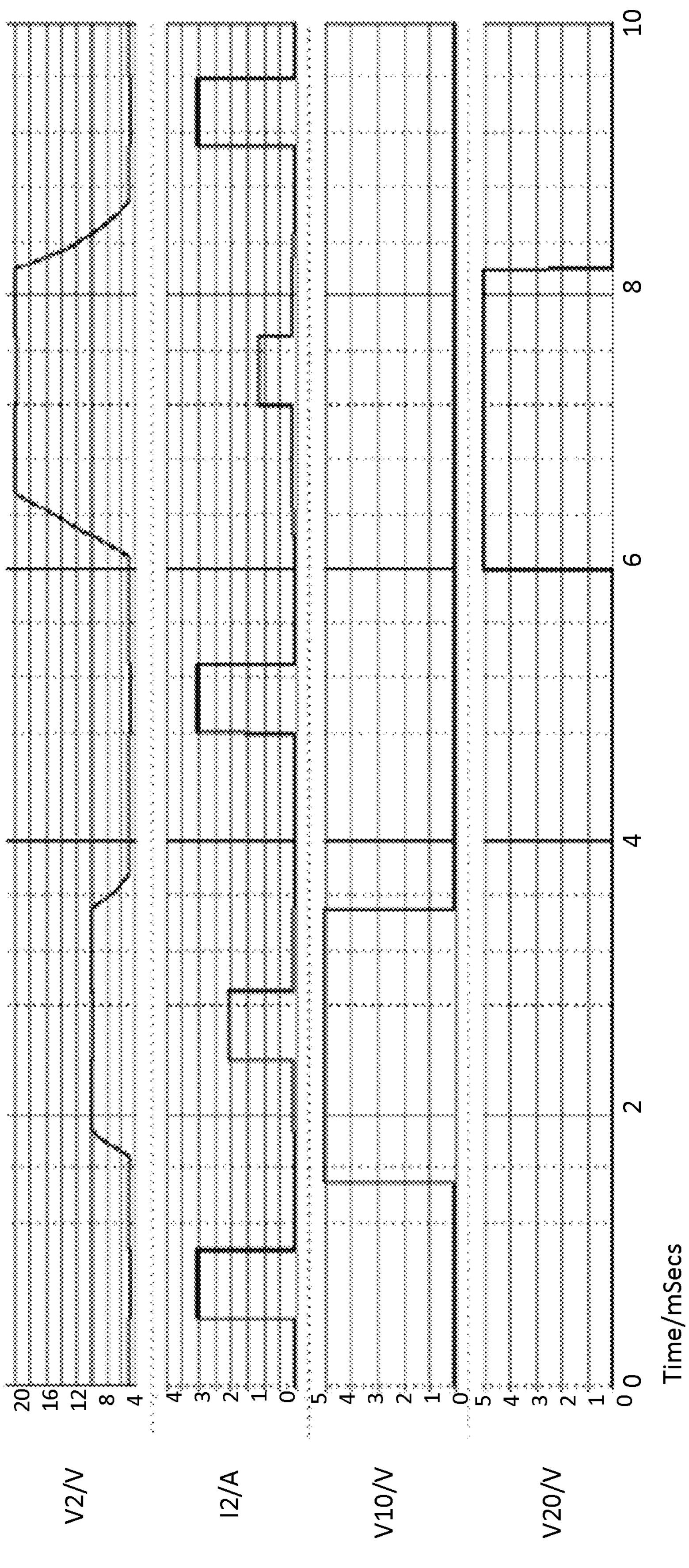
FIG. 9 shows slew control carried out by the slew-rate control circuitry shown in FIG. 6.

FIG. 9 shows typical voltage transitions for the switched-capacitor circuit with slew-rate limited bypass switch control in a Type-C USB power adapter. The second voltage V2 slews up and down at approximately 20 mV/μs. According to the USB PD specification, the load must be in a low-power standby state during voltage transitions. For the simulation results shown in FIG. 9, the load was turned on after the output settled to its final level.

Figure 10:
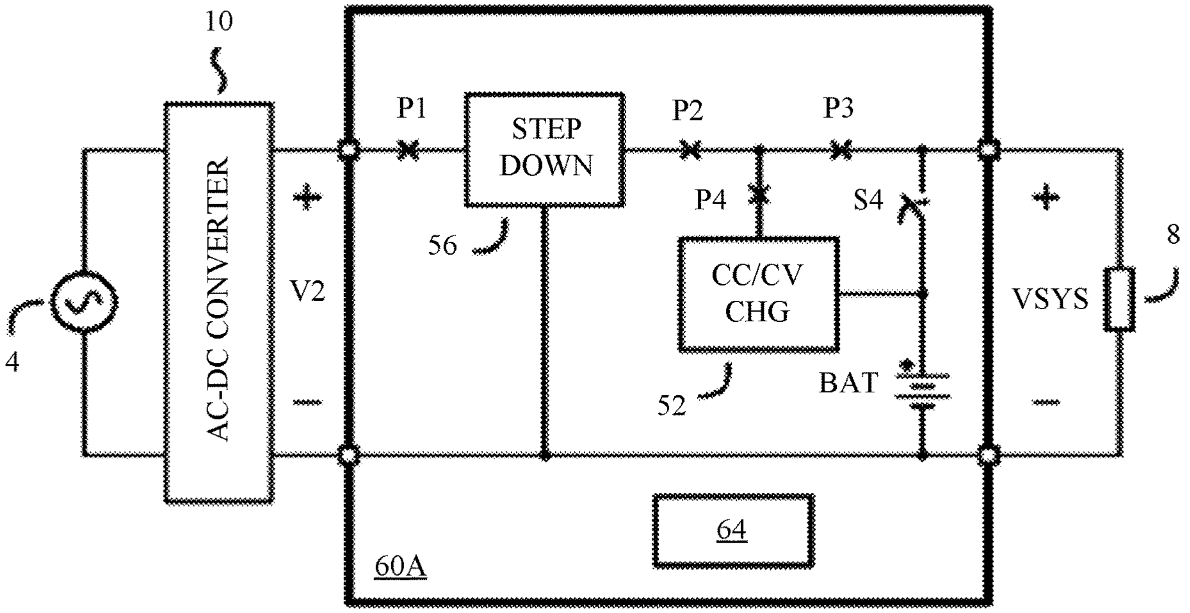
FIG. 10 shows several locations for incorporation of an adiabatic switched-capacitor circuit into a first embodiment of a battery manager.

FIG. 10 illustrates a first battery manager 60A that provides energy to power to a load 8 while also providing energy for charging a battery BAT using power delivered from an ac-dc converter 10 connected to an AC source 4. The first battery manager 60A supplies a system voltage VSYS for powering the load 8. It does so even when the ac-dc converter 10 is disconnected from the battery manager 60A.

The AC source 4 need not be a wall-source. Instead, the AC source 4 can be part of a wireless charging system for charging the device. Such a wireless charging system typically includes a base station and a device to be charged. The base station receives AC at a first frequency and provides it to a frequency-converter that steps it up to a higher frequency and provides it to a first coil. The device to be charged includes a second coil selected such that, when brought in proximity with the first coil, the two form an air-core transformer. This permits energy provided by the first coil to be made available at the second coil so that it can be used to charge the battery on the device to be charged.

The conversion to a higher frequency is useful for ensuring that the first coil can be made a reasonable size. Typical output frequencies are in the range of 50 kHz. Various standards exist for the extent of the frequency transition and the amount of voltage and/or current provided by the base station. An example of such a standard is the QI standard.

The first battery manager 60A includes a step-down converter 56 that transforms a second voltage V2 provided by the ac-dc converter 10 into the system voltage VSYS. It also includes a constant-current/constant voltage (CCCV) charger 52 that provides power for charging the battery BAT. The charger 52 includes circuitry for maintaining either a constant current or a constant voltage while charging of the battery, for measuring the amount of charge on the battery, and for providing protection from faults. The step-down converter 56 can either be a part of a device powered by the battery or it can be placed outside such a device. A battery switch S4 selectively connects and disconnects the battery BAT from the load 8. A second controller 64 synchronizes operation of the step-down converter 56 and the charger 52.

When the ac-dc converter 10 connects to an AC source 4, the battery BAT is not needed for supplying power to the load 8. Accordingly, the second controller 64 opens the battery switch S4. Meanwhile, the step-down converter 56 lowers the second voltage V2 to a value a little above the charging voltage of the battery BAT, thereby allowing the CC/CV charger 52 to charge the battery efficiently, assuming the battery is not already fully charged. The step-down converter 56 also provides the necessary system voltage VSYS to the load 8.

However, once the ac-dc converter 10 is disconnected, the step-down converter 56 can no longer supply power. The second controller 64 therefore closes the battery switch S4 so that the battery BAT can supply the necessary system voltage VSYS.

Figure 11:
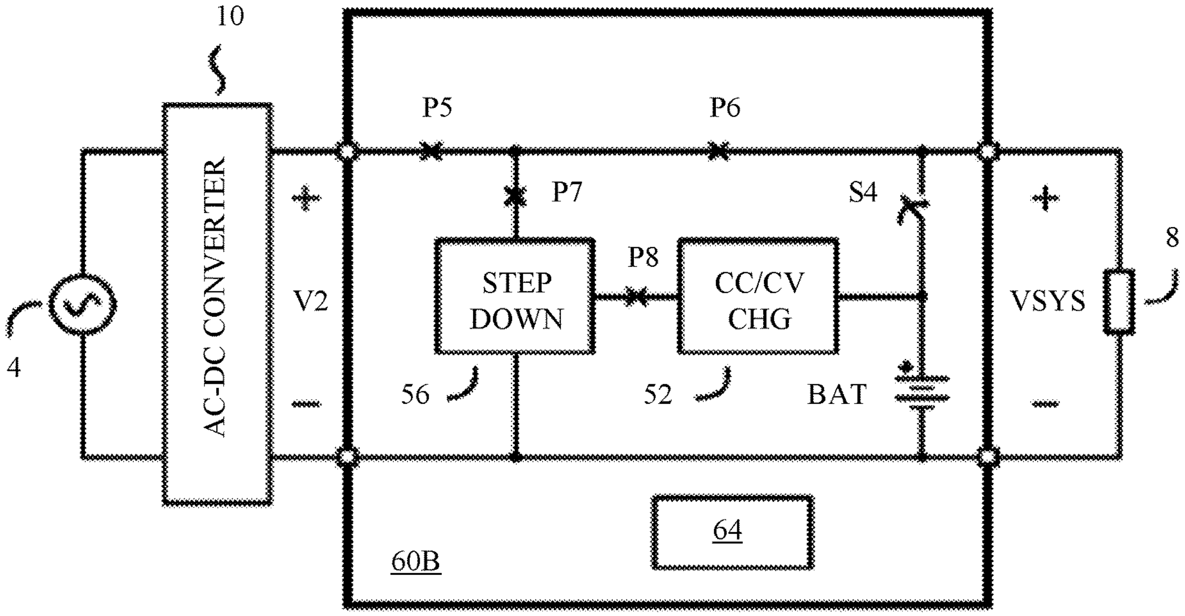
FIG. 11 shows several locations for incorporation of an adiabatic switched-capacitor circuit into a second embodiment of a battery manager.

FIG. 11 illustrate a second battery manager 60B, where the charging voltage and system voltage VSYS are separated, unlike in the first battery manager 60A. The battery switch S4 is only closed when the battery is used as a source of power for the system voltage VSYS. The advantage of this second battery manager 60B over the first battery manager 60A is that the step-down converter 56 does not have to supply power to charge the battery BAT and the system voltage VSYS when the ac-dc converter 10 is connected.

In some embodiments, the ac-dc converter 10 includes an adiabatically charged switched-capacitor converter of the type illustrated in FIGS. 2-4 and variants thereof.

FIGS. 10 and 11 collectively show first through eighth locations P1, P2 . . . P8 in which an adiabatic switched-capacitor circuit 18 of the type shown in FIG. 3 can be placed within the first and second battery managers 60A, 60B. More than one adiabatic switched-capacitor circuit 18 can actually be used, however, the largest performance improvement will likely be seen by only incorporating a single adiabatic switched-capacitor circuit 18.

Figure 12:
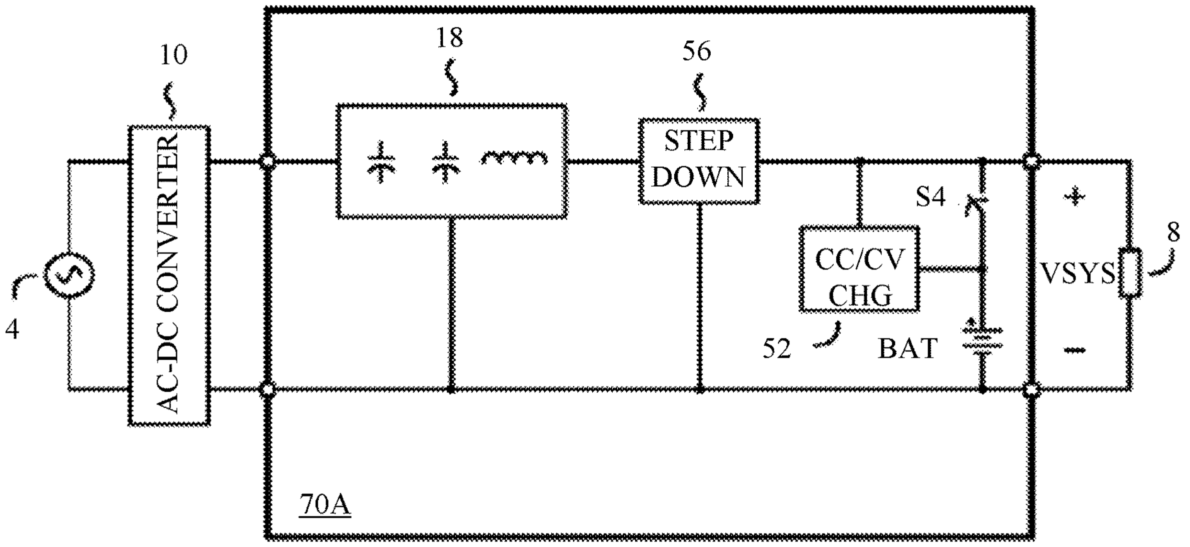
FIG. 12-15 show battery managers with an adiabatic switched-capacitor circuit at four of the locations shown in FIGS. 10-11.

FIG. 12 shows a third battery manager 70A in which the adiabatic switched-capacitor circuit 18 is placed at the first location P1. Incorporating an adiabatic switched-capacitor circuit 18 into the third battery manager 70A reduces the burden on the step-down converter 56. For example, in the third battery manager 70A, shown in FIG. 12, the voltage stress is about half of what it would have been had the adiabatic switched-capacitor circuit 18 been omitted. This has the effect of drastically reducing the power loss in the step-down converter 56 for a given output power.

Figure 13:
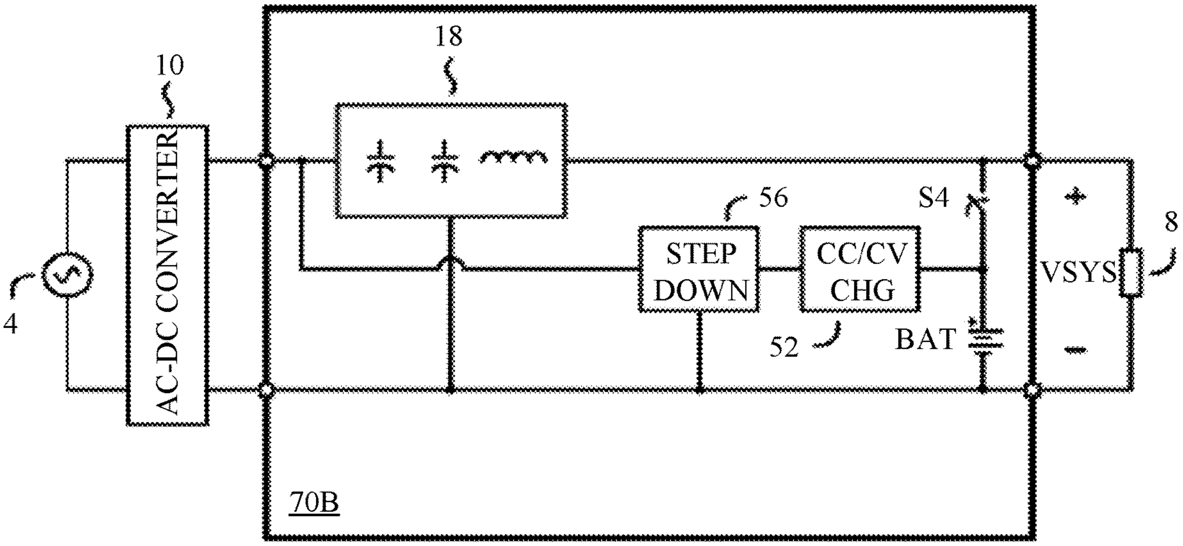

FIG. 13 shows a fourth battery manager 70B in which the adiabatic switched-capacitor circuit 18 is instead placed at the sixth location P6. Placement of the adiabatic switched-capacitor circuit 18 provides a way to target the part of the circuit in which improvement is sought. For example, in the fourth battery manager 70B, shown in FIG. 13, the main improvement is not in the step-down converter 56, but in the downstream point-of-load (POL) converters in a load 8.

The configurations shown in FIGS. 12 and 13 are particularly useful because they are most compatible with existing integrated circuits that implement battery managers.

Figure 14:
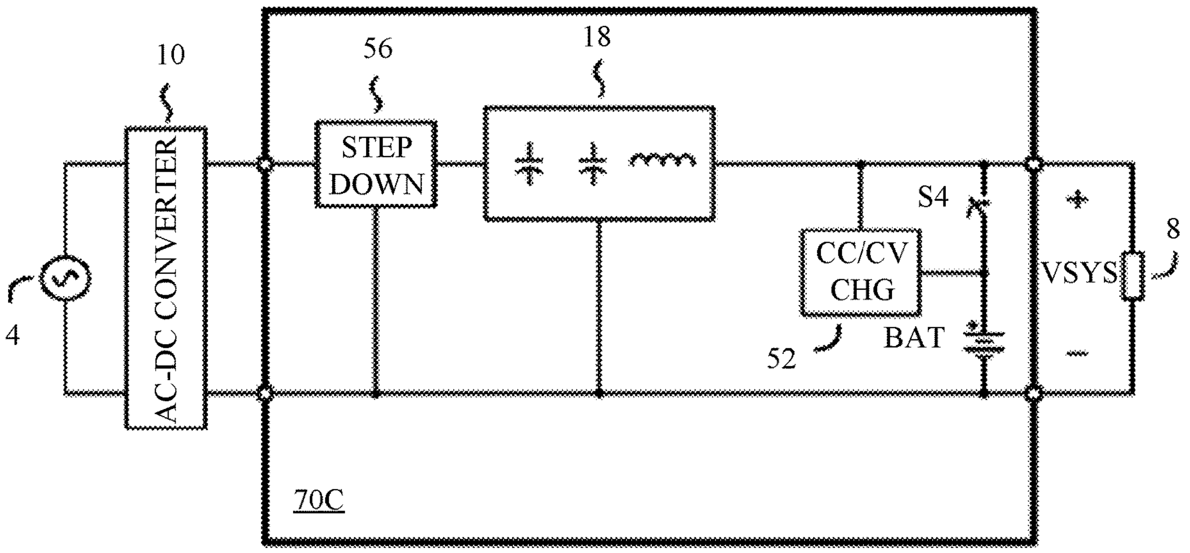
Figure 15:
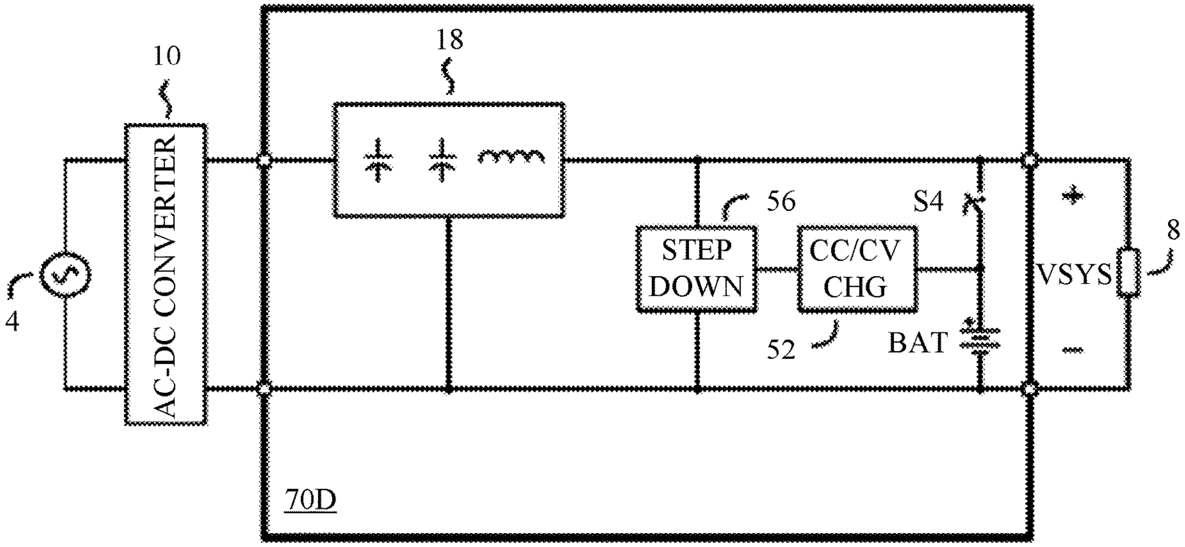

FIG. 14 shows a fifth battery manager 70C in which the adiabatic switched-capacitor circuit 18 has been placed in the second position P2. FIG. 15 shows a sixth battery manager 70D in which the adiabatic switched-capacitor circuit 18 has been placed in the fifth position P5.

Figure 16:
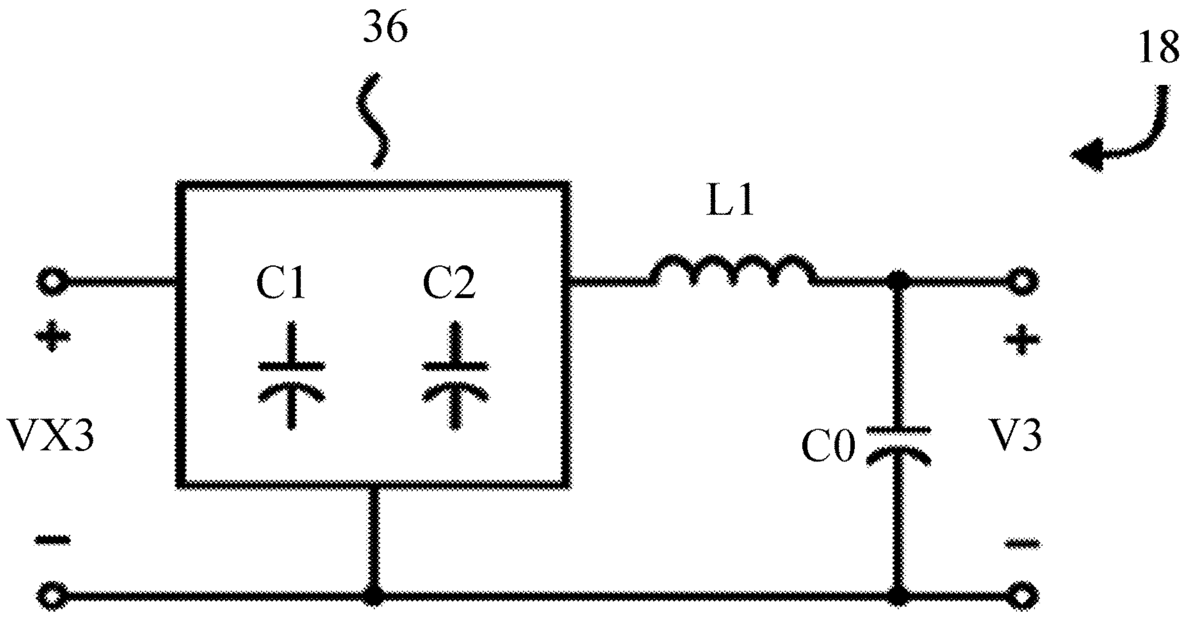
FIG. 16 is a functional block diagram of a typical adiabatic switched-capacitor circuit.

FIG. 16 shows a block diagram of a typical adiabatic switched-capacitor circuit 18. The circuit is a 2× voltage divider that provides a 2:1 voltage conversion from an input voltage VX3 to an output voltage V3. This adiabatic switched-capacitor circuit 18 is designed to accept a maximum input voltage of 24 volts.

FIG. 17 shows an example component list for the architecture in FIG. 16.

Figure 18:
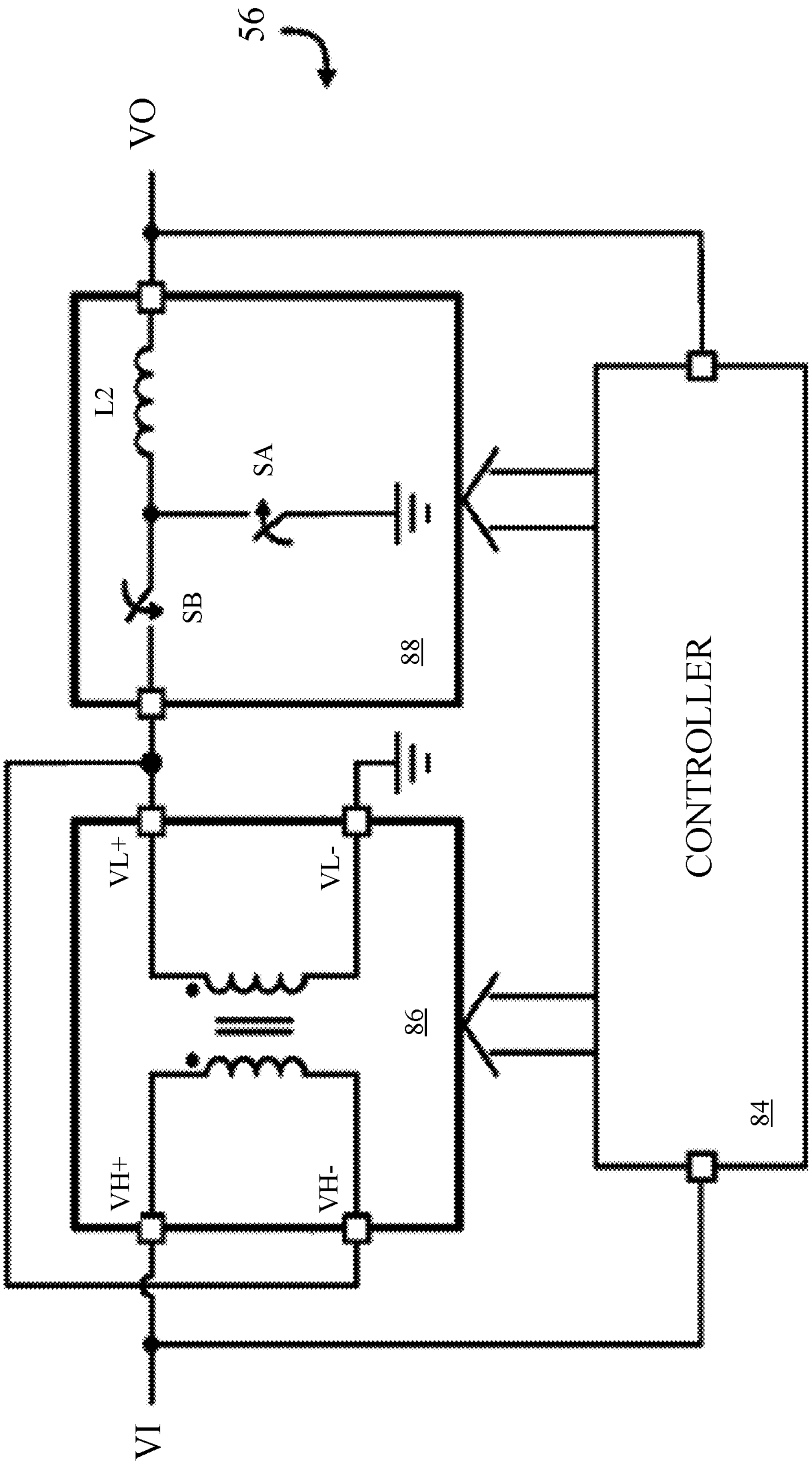
FIGS. 18-20 show an implementation of the step-down converter of FIGS. 10-11 that includes an adiabatically charged switched-capacitor network.

A typical step-down converter 56 as shown in FIGS. 10-11 generally includes a switching regulator. Accordingly, some embodiments incorporate a switched-capacitor converter 86 in the step-down converter 56 together with a third controller 84 that controls both the switched-capacitor converter 86 and the built-in switching regulator 88. The third controller 84 can thus operate the switched-capacitor converter 86, as shown in FIG. 18, in such a way that the switching regulator 88 adiabatically charges and discharges the capacitors within the switched-capacitor converter 86. This provides a way to achieve adiabatic charge and discharge without the need to provide an extra LC filter with the switched-capacitor converter 86. Additionally, the switched-capacitor converter 86 in this case is inherently modular and can readily be supplied as a separate component to be incorporated in an existing step-down converter 56.

Figure 19:
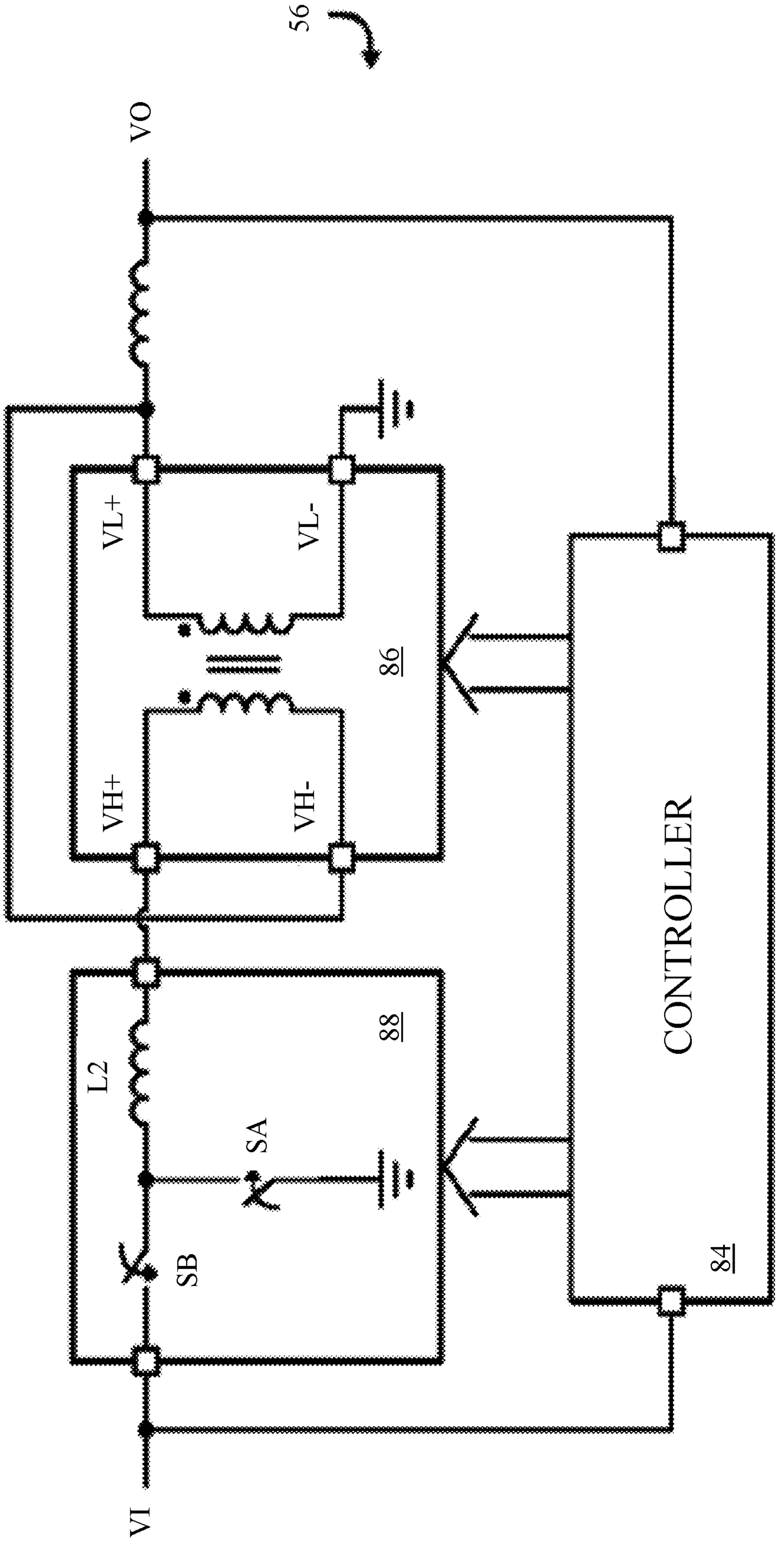
Figure 20:
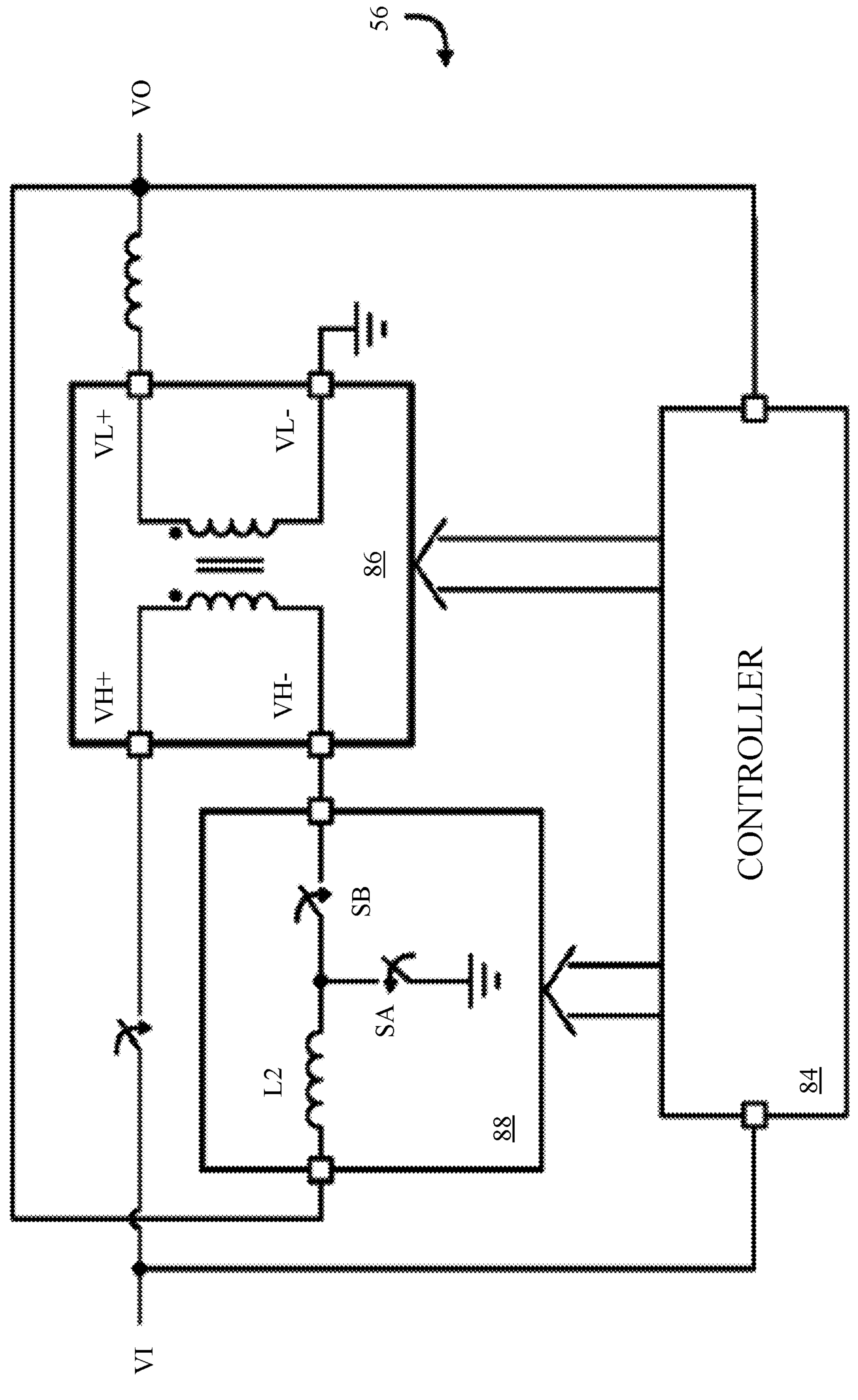

FIGS. 19-20 illustrate two additional architectures that implement the same concept. The embodiment shown in FIG. 19 is the reverse of the embodiment in FIG. 18. While the embodiment shown in FIG. 20, provides an efficient way to convert power by placing the switching regulator 88 in series with the input of the switched-capacitor converter 86 and in parallel with the output of the switched-capacitor converter 86. Therefore, the switching regulator 88 only carries a fraction of the current delivered to the output while still retaining the ability to directly control the current delivered to the output.

The third controller 84 in the embodiments of FIGS. 18-20 provides control signals to turn the switches within the switching regulator 88 and the switched-capacitor converter 86 on and off in response to a sensed output voltage VO and/or input voltage V1. Based on these inputs, the controller 84 makes necessary adjustments to the control signals provided to switching regulator 88 and to the switched-capacitor converter 86 such that the such that the output voltage VO is regulated within some tolerance.

In the illustrated embodiments, the switching regulator 88 is a Buck converter that includes a first switch SA, a second switch SB, and an inductor L2. When the first switch SA is closed, the second switch SB is open, and vice versa. The first and second switches SA, SB operate at a specific frequency. This frequency controls an average dc current through the inductor L2. This makes it possible to control the voltage at the output terminal of the inductor L2 (i.e., the terminal not connected to the switches) by varying the duty cycle of the first switch SA. In particular, the longer the first switch SA is closed during a cycle the lower the voltage at the output terminal of the inductor L2 will be.

Figure 21:
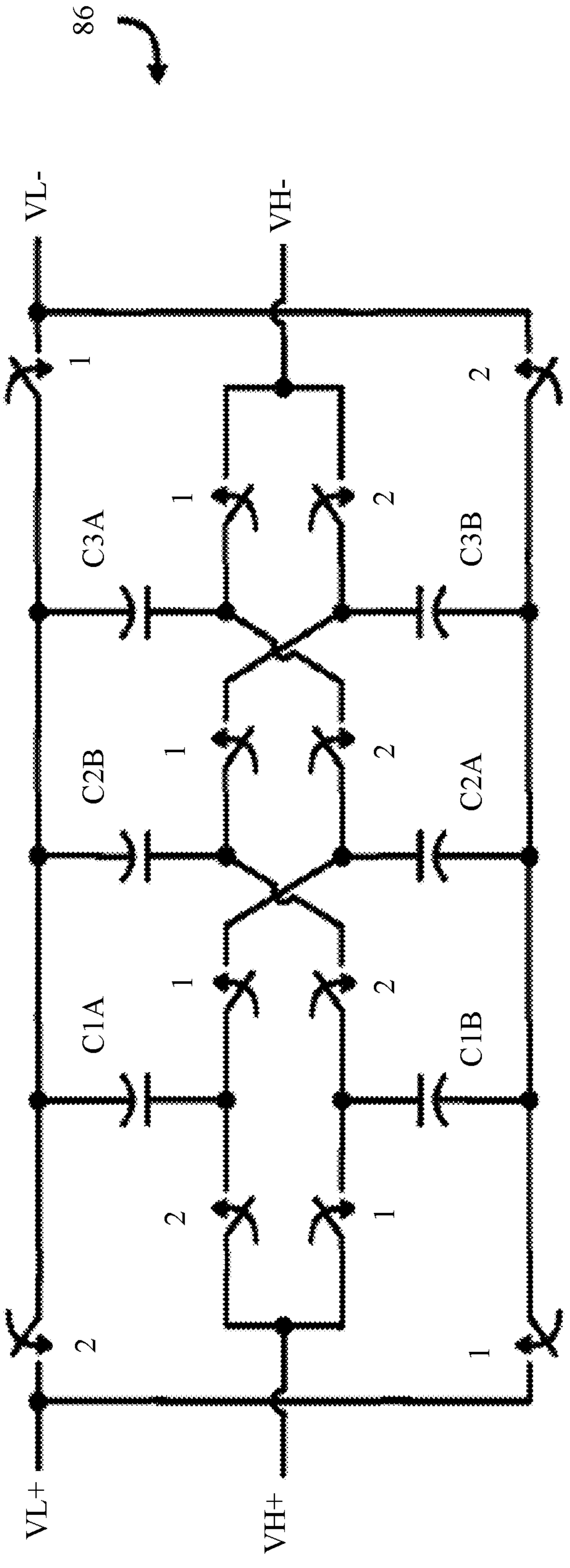
FIG. 21 is a cascade multiplier for use as a switched-capacitor network in the embodiments of FIGS. 18-20.

FIG. 21 illustrates a detailed circuit diagram of one implementation in which the switched-capacitor converter 86 is a full-wave cascade multiplier. The switched-capacitor converter 86 includes a first set 1 of switches, a second set 2 of switches, and capacitors C1A-C3B. Closing switches in the first switch set 1 and opening switches in the second switch set 2 arranges the capacitors C1A-C3B are arranged in a first state. Conversely, closing the switches in the second set 2 and opening the switches in the first set 1 arranges the capacitors C1A-C3B in a second state. During normal operation, the switched-capacitor converter 86 cycles between the first state and the second state at a specific frequency, thereby transferring charge between the capacitors C1A-C3B and terminals. The switched-capacitor converter 86 can be modeled as a dc transformer as in FIGS. 18-20. In this implementation, the voltage conversion ratio (VH to VL) is three to one.

In some implementations, a computer-accessible storage-medium includes a database representative of one or more components of the converter. For example, the database may include data representative of a switching network that has been optimized to promote low-loss operation of a charge pump.

Generally speaking, a computer-accessible storage-medium may include any non-transitory storage media accessible by a computer during use to provide instructions and/or data to the computer. For example, a computer accessible storage medium may include storage media such as magnetic or optical disks and semiconductor memories.

Generally, a database representative of the system may be a database or other data structure that can be read by a program and used, directly or indirectly, to fabricate the hardware comprising the system. For example, the database may be a behavioral-level description or register-transfer level (RTL) description of the hardware functionality in a high level design language (HDL) such as Verilog or VHDL. The description may be read by a synthesis tool that may synthesize the description to produce a netlist comprising a list of gates from a synthesis library. The netlist comprises a set of gates that also represent the functionality of the hardware comprising the system. The netlist may then be placed and routed to produce a data set describing geometric shapes to be applied to masks. The masks may then be used in various semiconductor fabrication steps to produce a semiconductor circuit or circuits corresponding to the system. In other examples, Alternatively, the database may itself be the netlist (with or without the synthesis library) or the data set.

Having described the invention, and a preferred embodiment thereof, what is claimed as new, and secured by Letters Patent is:

1. An apparatus comprising:

a switching regulator configured to be electrically coupled to an AC-DC converter;

a charge pump coupled to the switching regulator, wherein the charge pump comprises a plurality of switches configured to form at least a part of a switched capacitor network, the switched capacitor network comprising at least one switching configuration;

a charger configured to receive a voltage from at least one of: the switching regulator, the charge pump, or a combination of the switching regulator and the charge pump; and at least one controller configured to control the switching regulator, the charge pump, and the charger to provide the voltage, wherein the voltage comprises at least one of: a system voltage for powering a load, a charging voltage to charge a battery, or a combination of the system voltage for powering the load and the charging voltage to charge the battery.

2. The apparatus of claim 1, wherein the charge pump is positioned between a voltage source and the switching regulator.

3. The apparatus of claim 1, further comprising a first line coupling the switching regulator to an output node of the apparatus and a second line coupling the charger to a node on the first line, wherein the charge pump is positioned between the switching regulator and the node on the first line.

4. The apparatus of claim 1, further comprising a first line coupling the switching regulator to an output node of the apparatus and a second line coupling the charger to a node on the first line, wherein the charge pump is positioned between the charger and the node on the first line.

5. The apparatus of claim 1, further comprising a first line coupling the switching regulator to an output node of the apparatus, wherein the charge pump is positioned between a first node on the first line and a second node on the first line.

6. The apparatus of claim 1, wherein:

the at least one controller is configured to control the switching regulator and the charge pump such that energy passes through the charger and through at least one of: the switching regulator, the charge pump, or a combination of the switching regulator and the charge pump to charge the battery.

7. The apparatus of claim 1, wherein the at least one controller comprises a plurality of controllers.

8. The apparatus of claim 7, wherein the plurality of controllers comprise a first controller configured to control the switching regulator.

9. The apparatus of claim 7, wherein the plurality of controllers comprise a second controller configured to control the charge pump.

10. The apparatus of claim 7, wherein the plurality of controllers comprise a third controller configured to control the charger.

11. The apparatus of claim 1, wherein the charge pump comprises a first charge pump and a second charge pump.

12. The apparatus of claim 11, wherein the charge pump further comprises a plurality of bypass switches configured to be controlled by the at least one controller to selectively bypass at least one of: the first charge pump, the second charge pump, or a combination of the first charge pump and the second charge pump.

13. The apparatus of claim 1, wherein the charge pump is configured to charge the battery.

14. The apparatus of claim 1, wherein the charger is configured to charge the battery.

15. The apparatus of claim 1, wherein the charger is a buck-boost battery charger.

16. The apparatus of claim 1, wherein a source of the voltage provided is a part of a wireless charging system.

17. The apparatus of claim 1, wherein a source of the voltage is provided through a USB port.

18. The apparatus of claim 1, wherein the charger comprises a circuitry configured to maintain a constant current or a constant voltage while charging the battery.

19. The apparatus of claim 1, wherein the charger comprises a circuitry configured to measure an amount of charge on the battery.

20. The apparatus of claim 1, wherein the charger comprises a circuitry configured to provide protection from a fault.

21. The apparatus of claim 1, further comprising at least one switch configured to selectively connect and disconnect the battery from the load.

22. A method comprising:

receiving, by a charger, a voltage from at least one of: a switching regulator, a charge pump electrically coupled to the switching regulator, or a combination of the switching regulator and the charge pump, wherein the switching regulator is to be electrically coupled to an AC-DC converter, and wherein the charge pump comprises a plurality of switches forming at least a part of a switched capacitor network, the switched capacitor network comprising at least one switching configuration; and controlling the switching regulator, the charge pump, and the charger to provide the voltage, wherein the voltage comprises at least one of: a system voltage for powering a load, a charging voltage to charge a battery, or a combination of the system voltage for powering the load and the charging voltage to charge the battery.

23. The method of claim 22, wherein the charge pump is positioned between a voltage source and the switching regulator.

24. The method of claim 22, further comprising a first line coupling the switching regulator to an output node of an apparatus and a second line coupling the charger to a node on the first line, wherein the charge pump is positioned between the switching regulator and the node on the first line.

25. The method of claim 22, further comprising a first line coupling the switching regulator to an output node of an apparatus and a second line coupling the charger to a node on the first line, wherein the charge pump is positioned between the charger and the node on the first line.

26. The method of claim 22, further comprising a first line coupling the switching regulator to an output node of an apparatus, wherein the charge pump is positioned between a first node on the first line and a second node on the first line.

27. The method of claim 22, further comprising:

controlling the switching regulator and the charge pump such that energy passes through at least one of: the switching regulator, the charge pump, or a combination of the switching regulator and the charge pump to charge the battery, wherein the energy passes through the charger.

28. The method of claim 22, wherein the charge pump comprises a first charge pump and a second charge pump.

29. The method of claim 28, further comprising controlling, by at least one controller, a plurality of bypass switches of the charge pump to selectively bypass at least one of: the first charge pump, the second charge pump, or a combination of the first charge pump and the second charge pump.

30. The method of claim 22, wherein the charge pump charges the battery.

31. The apparatus of claim 1, further comprising:

an integrated circuit comprising:

the plurality of switches; and the at least one controller configured to generate control signals to control the plurality of switches according to a switching frequency, wherein the switched capacitor network is configured to provide the voltage to the charger.

32. The apparatus of claim 31, wherein the load comprises a system voltage node.

33. The apparatus of claim 31, wherein the plurality of switches is configured to form at least one phase to operate in at least one operation mode to convert the voltage.

34. The apparatus of claim 33, wherein the at least one phase comprises a first charge pump, a second charge pump, and a plurality of bypass switches configured to be controlled by the at least one controller to selectively bypass at least one of: the first charge pump, the second charge pump, or a combination of the first charge pump and the second charge pump.

35. The apparatus of claim 31, wherein at least some switches of the plurality of switches are coupled to a negative terminal of the switched capacitor network to facilitate transition of the switched capacitor network between a first state and a second state at a specific frequency.

36. The apparatus of claim 35, wherein the first state is a charging state and the second state is a discharging state.

37. The apparatus of claim 31, wherein at least some switches of the plurality of switches are configured to form phase switches coupled to a negative terminal of at least one fly capacitor.

38. An integrated circuit comprising:

a plurality of switches configured to form at least a part of a switching regulator, the switching regulator configured to be electrically coupled to an AC-DC converter, wherein the plurality of switches is configured to transform a voltage when used with an inductor external to the integrated circuit; and a controller configured to generate control signals to control the plurality of switches to provide the voltage to at least a charger, a charge pump, or a combination of the charger and the charge pump, wherein the voltage comprises at least one of: a system voltage for powering a load, a charging voltage to charge a battery, or a combination of the system voltage for powering the load and the charging voltage to charge the battery.

39. An integrated circuit comprising:

a charger;

a controller configured to control the charger to receive a voltage from at least one of:

a switching regulator, a charge pump, or a combination of the switching regulator and the charge pump, wherein the switching regulator is configured to be electrically coupled to an AC-DC converter, and wherein the voltage comprises at least one of: a system voltage for powering a load, a charging voltage to charge a battery, or a combination of the system voltage for powering the load and the charging voltage to charge the battery; and a second controller configured to synchronize an operation of the switching regulator and the charger.

40. The integrated circuit of claim 39, wherein the controller is configured to maintain a constant current, a constant voltage, or a constant current and a constant voltage to charge the battery.

41. The integrated circuit of claim 39, further comprising at least one switch configured to selectively connect or disconnect the battery to the load.

42. The integrated circuit of claim 39, wherein the second controller is configured to selectively connect or disconnect at least one switch to selectively connect or disconnect the battery to the load.

43. The integrated circuit of claim 42, wherein the second controller is configured to connect the at least one switch to connect the battery to the load when the voltage received by the charger is zero.

* * * * *